US012146298B2

(12) United States Patent
Fukuda

(10) Patent No.: US 12,146,298 B2
(45) **Date of Patent: *Nov. 19, 2024**

(54) HYDRAULIC SYSTEM FOR WORKING MACHINE

(71) Applicant: KUBOTA CORPORATION, Osaka (JP)

(72) Inventor: Yuji Fukuda, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,664

(22) Filed: Nov. 1, 2023

(65) Prior Publication Data

US 2024/0060273 A1 Feb. 22, 2024

Related U.S. Application Data

(63) Continuation of application No. 18/099,454, filed on Jan. 20, 2023, now Pat. No. 11,846,090, which is a
(Continued)

(30) Foreign Application Priority Data

Sep. 30, 2020 (JP) ................................ 2020-165780
Oct. 13, 2020 (JP) ................................ 2020-172797

(51) Int. Cl.
*E02F 9/22* (2006.01)
*E02F 3/42* (2006.01)
*F15B 11/16* (2006.01)

(52) U.S. Cl.
CPC ............ *E02F 9/2285* (2013.01); *E02F 3/425* (2013.01); *E02F 9/2225* (2013.01);
(Continued)

(58) Field of Classification Search
CPC ..... F15B 11/055; F15B 11/163; F15B 11/165; F15B 2211/30555; E02F 9/2225; E02F 9/2228; E02F 9/2232; E02F 9/2235
See application file for complete search history.

(56) References Cited

U.S. PATENT DOCUMENTS 4,986,071 A * 1/1991 Voss ...................... E02F 9/2221 60/420
5,077,972 A 1/1992 Bianchetta et al.
(Continued)

FOREIGN PATENT DOCUMENTS

JP 60-126553 8/1985
JP 9-72302 3/1997
(Continued)

OTHER PUBLICATIONS

Office Action issued in Corresponding JP Patent Application No. 2020-165780, dated Aug. 1, 2023, along with an English translation thereof.
(Continued)

*Primary Examiner* — Michael Leslie
(74) *Attorney, Agent, or Firm* — Greenblum & Bernstein, P.L.C.

(57) ABSTRACT

A hydraulic system for a working machine includes a variable displacement hydraulic pump, a plurality of hydraulic actuators, and a plurality of control valves. Each of the control valves includes an input port, an output port, and a flowrate reduction section. At least one of the control valves includes a flowrate increase section. The hydraulic actuators are a boom cylinder, a working tool cylinder, and an auxiliary actuator. The control valves are a boom control valve for controlling the boom cylinder, a working tool control valve for controlling the working tool cylinder, and a first auxiliary control valve for controlling the auxiliary actuator. The boom control valve and the working tool control valve each include the flowrate reduction section, and the first auxiliary control valve includes the flowrate reduction section and the flowrate increase section.

4 Claims, 31 Drawing Sheets

Related U.S. Application Data continuation of application No. 17/487,747, filed on Sep. 28, 2021, now Pat. No. 11,608,616.

(52) U.S. Cl.
CPC .......... *E02F 9/2296* (2013.01); *F15B 11/163* (2013.01); *F15B 11/165* (2013.01); *F15B 11/166* (2013.01); *F15B 2211/30555* (2013.01); *F15B 2211/3111* (2013.01); *F15B 2211/329* (2013.01); *F15B 2211/351* (2013.01); *F15B 2211/40569* (2013.01); *F15B 2211/45* (2013.01)

(56) References Cited

U.S. PATENT DOCUMENTS

| | | | | |
|---|---|---|---|---|
| 5,791,142 | A * | 8/1998 | Layne | E02F 9/2271 91/446 |
| 7,036,308 | B2 | 5/2006 | Rollmann | |
| 7,500,360 | B2 | 3/2009 | Udagawa et al. | |
| 7,581,487 | B2 | 9/2009 | Bulgarelli | |
| 7,726,125 | B2 * | 6/2010 | Brinkman | E02F 9/2296 60/452 |
| 7,854,115 | B2 | 12/2010 | Pack et al. | |
| 8,281,583 | B2 | 10/2012 | Kauss | |
| 9,140,275 | B2 | 9/2015 | Dengler | |
| 9,829,014 | B2 * | 11/2017 | Kleitsch | F15B 11/165 |
| 10,422,110 | B2 | 9/2019 | Hatanaka et al. | |
| 10,563,377 | B2 | 2/2020 | Kishida et al. | |
| 10,676,899 | B2 | 6/2020 | Kim | |
| 11,293,460 | B2 | 4/2022 | Quan et al. | |
| 11,608,616 | B2 * | 3/2023 | Fukuda | E02F 3/425 |
| 11,846,090 | B2 * | 12/2023 | Fukuda | E02F 9/2285 |

FOREIGN PATENT DOCUMENTS

| | | |
|---|---|---|
| JP | 2009-133493 | 6/2009 |
| JP | 2016-125560 A | 7/2016 |

OTHER PUBLICATIONS

Office Action issued in Corresponding JP Patent Application No. 2020-172797, dated Jul. 11, 2023, along with an English translation thereof.

* cited by examiner

HYDRAULIC SYSTEM FOR WORKING MACHINE

CROSS REFERENCE TO RELATED APPLICATIONS

This is a continuation of U.S. patent application Ser. No. 18/099,454, filed Jan. 20, 2023, which is a continuation of U.S. patent application Ser. No. 17/487,747, filed Sep. 28, 2021, now U.S. Pat. No. 11,608,616, which claims the benefit of priorities to Japanese Patent Application No. 2020-165780 filed on Sep. 30, 2020 and Japanese Patent Application No. 2020-172797 filed on Oct. 13, 2020. The disclosure of each of the above-mentioned documents, including the specification, drawings, and claims, is incorporated herein by reference in its entirety.

BACKGROUND OF THE INVENTION

Field of the Invention

The present invention relates to a hydraulic system for a working machine such as a skid steer loader or a compact track loader

Description of the Related Art

Japanese Unexamined Patent Publication No. 2016-125560 (Patent Document 1) discloses a working machine such as a skid steer loader or a compact track loader provided with a variable displacement pump and a plurality of control valves.

The working machine of Patent Document 1 includes a variable displacement hydraulic pump configured to change a flowrate of hydraulic fluid to be delivered, a plurality of hydraulic actuators to be operated with the hydraulic fluid, and a plurality of control valves each of which is configured to be shifted between a plurality of positions and control a flowrate of fluid to each of the hydraulic actuators according to its position-shift.

In addition, the working machine of Patent Document 1 includes a hydraulic fluid passage through which hydraulic fluid supplied from a main pump, an increasing fluid passage for increasing the hydraulic fluid in the hydraulic fluid passage by supplying hydraulic fluid supplied from a sub-pump different from the main pump, the increasing fluid passage being connected to the hydraulic fluid passage, a connecting device provided on an end portion of the hydraulic fluid passage connected to the increasing fluid passage, the connecting device being provided for connecting a hydraulic actuator, a high-flow valve provided in the increasing fluid passage and configured to control the increasing of hydraulic fluid in the increasing fluid passage, and a controller configured to control the increase of hydraulic fluid in the high-flow valve depending on types of operation means.

SUMMARY OF THE INVENTION

In the working machine of Patent Document 1, due to the variability in the flowrate of hydraulic fluid to be delivered by the variable displacement hydraulic pump, each of the hydraulic actuators can be supplied with hydraulic fluid whose flowrate corresponds to its required flowrate. Specifically, a small amount of hydraulic fluid can be supplied to a hydraulic actuator configured to be operated with a small amount of hydraulic fluid, and a large amount of hydraulic fluid can be supplied to a hydraulic actuator configured to be operated with a large amount of hydraulic fluid. In the working machine of Patent Document 1, the flowrate of hydraulic fluid is made variable by operating the variable displacement hydraulic pump so that an LS (Load Sensing) differential pressure is kept constant, but a horsepower loss may cause depending on a generated amount of the LS differential pressure.

To solve the above-mentioned problems of the conventional technique, a hydraulic system for a working machine capable of easily suppressing a horsepower loss is desired.

Technical solution means is characterized by the following points.

In an aspect, a hydraulic system for a working machine includes a variable displacement hydraulic pump to deliver hydraulic fluid having a variable flowrate, a plurality of hydraulic actuators actuated with hydraulic fluid, and a plurality of control valves each of which is shiftable among a plurality of shift positions so that the control valve, when shifted to one of the shift positions, controls a flowrate of hydraulic fluid flowing to the corresponding hydraulic actuator. Each of the control valves includes an input port into which hydraulic fluid delivered from the variable displacement hydraulic pump is input, an output port from which the hydraulic fluid input into the input port is output, and a flowrate reduction section configured so that, when the control valve is shifted to a reduction position serving as a specific one of the shift positions, the flowrate reduction section reduces a flowrate of the hydraulic fluid entering the input port and outputs the flowrate-reduced hydraulic fluid to the output port. At least one of the control valves includes a flowrate increase section configured so that, when the control valve is shifted to an increase position serving as another shift position different from the specific one of the shift positions, the flowrate increase section outputs the hydraulic fluid having entered the input port to the output port at a flowrate larger than that of hydraulic fluid output by the flowrate reduction section. The hydraulic actuators are a boom cylinder, a working tool cylinder, and an auxiliary actuator. The control valves are a boom control valve for controlling the boom cylinder, a working tool control valve for controlling the working tool cylinder, and a first auxiliary control valve for controlling the auxiliary actuator. The boom control valve and the working tool control valve each include the flowrate reduction section, and the first auxiliary control valve includes the flowrate reduction section and the flowrate increase section.

The first auxiliary control valve having been shifted to the increase position returns from the increase position to the reduction position when either the boom control valve or the working tool control valve is shifted to the reduction position.

The hydraulic system for the working machine further includes a proportional valve to allow a pilot pressure to act on a pressure receiving portion of the first auxiliary control valve. The first auxiliary control valve is shifted to the reduction position and then to the increase position as the pilot pressure from the proportional valve acting on the pressure receiving portion increases.

According to the configuration, a horsepower loss can be minimized as much as possible.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
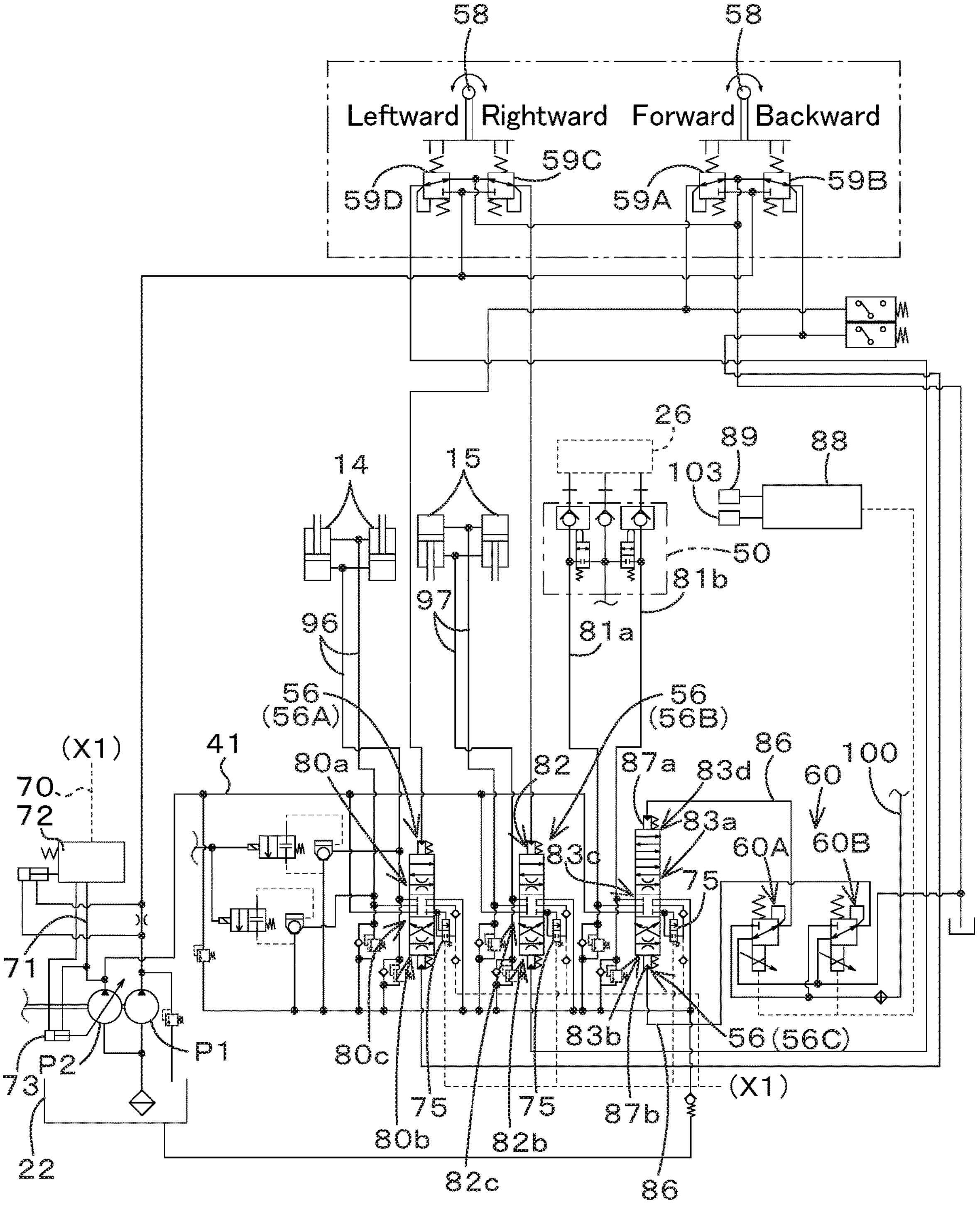
FIG. 1 is a schematic view of a hydraulic system for a working machine according to a first embodiment.

The preferred embodiments will now be described with reference to the accompanying drawings, wherein like reference numerals designate corresponding or identical elements throughout the various drawings. The drawings are to be viewed in an orientation in which the reference numerals are viewed correctly.

Some preferred embodiments of a hydraulic system for a working machine and of a working machine having the hydraulic system will be described below with reference to drawings.

First Embodiment

Figure 13:
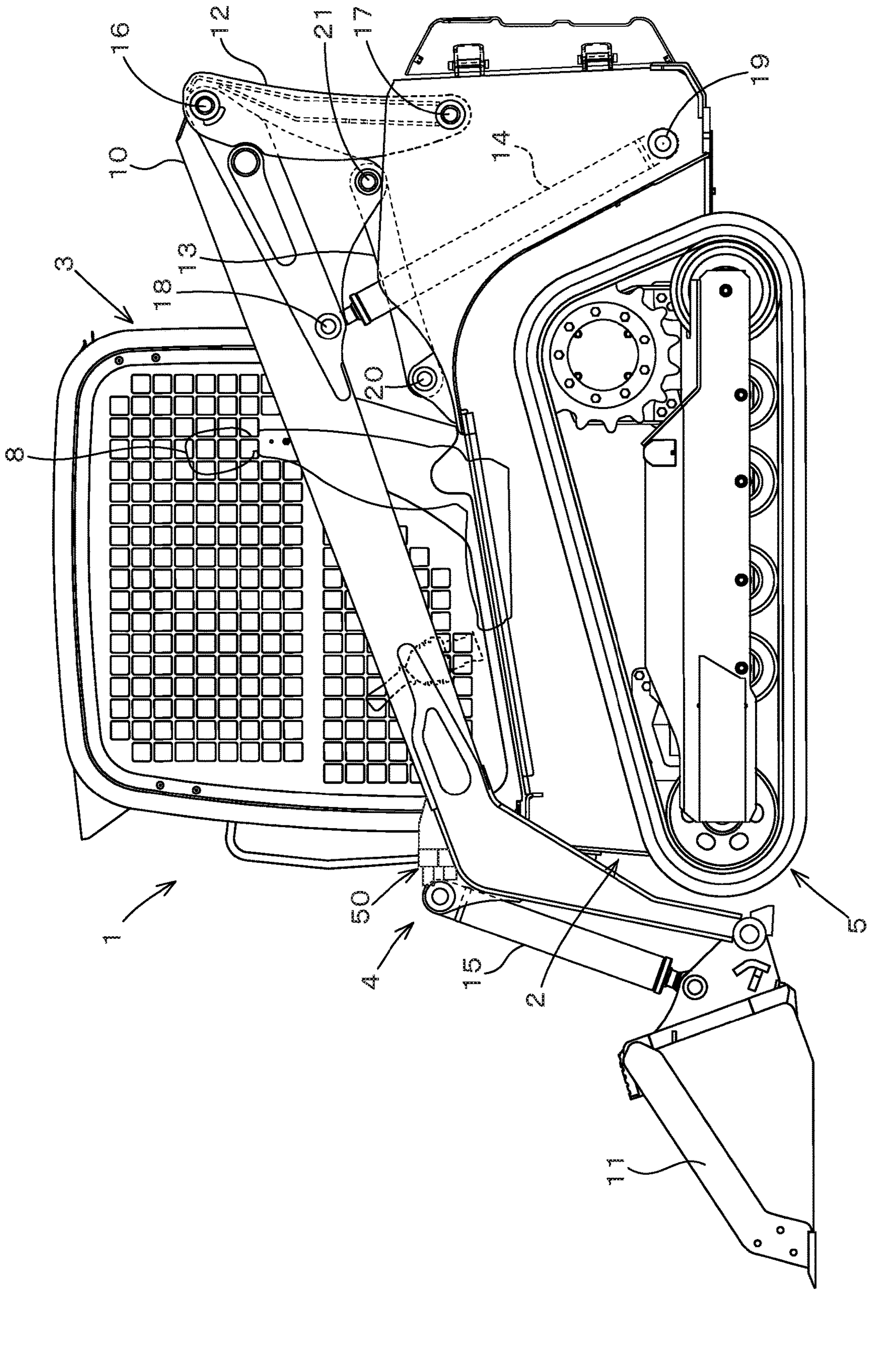
FIG. 13 is a side view showing a track loader that is an example of the working machine.

First, an overall configuration of a working machine will be explained. As shown in FIG. 13, the working machine 1 includes a machine body 2, a cabin 3, a working device 4, and traveling devices 5. In FIG. 13, a compact track loader is shown as an example of the working machine; however, the working machine is not limited to the compact track loader, and may be, for example, a tractor, a skid steer loader, a backhoe, or the like. In the present invention, a direction corresponding to a forward direction (leftward in FIG. 13) of a driver seated on a driver's seat 8 of the working machine is referred to as "front" or "forward", a direction corresponding to a rearward direction (rightward in FIG. 13) of the driver is referred to as "rear" or "rearward", a direction corresponding to a leftward direction (toward a front surface side of FIG. 13) of the driver is referred to as "left" or "leftward", and a direction corresponding to a rightward direction (toward a back surface side of FIG. 13) of the driver is referred to as "right" or "rightward".

The cabin 3 is mounted on the machine body 2. The cabin 3 incorporates the driver seat 8. The working device 4 is attached to the machine body 2. The traveling devices 5 are arranged on the outside of the machine body 2. A prime mover is mounted on a rear inside portion of the machine body 2. The working device 4 includes booms 10, a working tool 11, lift links 12, control links 13, boom cylinders 14, and working tool cylinders 15.

The booms 10 are arranged on right and left sides of the cabin 3 swingably up and down. The working tool 11 is a bucket, for example. The bucket 11 is arranged at tip portions (that is, front end portions) of the booms 10 movably up and down. The lift links 12 and the control links 13 support base portions (that is, rear portions) of the booms 10 so that the booms 10 can be swung up and down. The boom cylinders 14 are extended and contracted to lift and lower the booms 10. The working tool cylinders 15 are extended and contracted to swing the bucket 11.

Front portions of the right and left booms 10 are connected to each other by a deformed connecting pipe. Base portions (that is, rear portions) of the booms 10 are connected to each other by a circular connecting pipe.

The lift links 12, control links 13, and boom cylinders 14 are arranged on right and left sides of the machine body 2 to correspond to the right and left booms 10. The lift links 12 are extended vertically from rear portions of the base portions of the booms 10. An upper portion (one end portion) of each of the lift links 12 is pivotally supported via each of pivot shafts 16 on a rear portion of a base portion of each of the booms 10 rotatably around a lateral axis defined by the pivot shaft 16. In addition, a lower portion (the other end portion) of each of the lift links 12 is pivotally supported via each of pivot shafts 17 on a rear portion of the machine body 2 rotatably around a lateral axis defined by the pivot shaft 17. The pivot shafts 17 are provided below the pivot shafts 16.

An upper portion of each of the boom cylinders 14 is pivotally supported by each of pivot shafts 18 rotatably around a lateral axis defined by the pivot shaft 18. Each of the pivot shafts 18 is provided on a front portion of a base portion of each of the booms 10. A lower portion of the boom cylinder 14 is pivotally supported by each of pivot shafts 19 rotatably around a lateral axis defined by the pivot shaft 19. The pivot shafts 19 are provided on a lower rear portion of the machine body 2 and below the pivot shafts 18.

The control links 13 are provided in front of the lift links 12. One end of each of the control links 13 is pivotally supported by each of the pivot shafts 20 rotatably around a lateral axis defined by the pivot shaft 20. The pivot shafts 20 are provided on the machine body 2 forward of the lift links 12. The other end of each of the control links 13 is pivotally supported by each of the pivot shafts 21 rotatably around a lateral axis defined by the pivot shaft 21. The pivot shafts 21 are provided on the respective booms 10 in front of and above the pivot shafts 17.

By extending and contracting the boom cylinders 14, the booms 10 swing up and down around the pivot shafts 16 while the base portions of the booms 10 are supported by the lift links 12 and the control links 13, and thus tip portions of the booms 10 are raised and lowered. The control links 13 are swung up and down around the pivot shafts 20 by the booms 10 swinging up and down. The lift links 12 are swung back and forth around the pivot shafts 17 by the control links 13 swinging up and down.

An alternative working tool instead of the bucket 11 can be attached to the front portions of the booms 10. The alternative working tool is, for example, an attachment (that is, an auxiliary attachment) such as a hydraulic crusher, a hydraulic breaker, an angle broom, an earth auger, a pallet fork, a sweeper, a mower or a snow blower. A connecting member 50 is provided at the front portion of the left boom 10. The connecting member 50 is a device configured to connect a hydraulic equipment attached to the auxiliary attachment to a first piping member such as a pipe provided on the left boom 10. Specifically, the first piping member can be connected to one end of the connecting member 50, and a second piping member connected to the hydraulic equipment of the auxiliary attachment can be connected to the other end. In this manner, a hydraulic fluid flowing in the first piping member passes through the second piping member and is supplied to the hydraulic equipment.

Each of the working tool cylinders 15 is located near the front portion of each of the booms 10. By extending and contracting the working tool cylinders 15, the bucket 11 is swung. In this embodiment, a crawler-type (including semi-crawler-type) traveling device is employed for each of the traveling devices 5 provided on the left and right. Alternatively, a wheel-type traveling device having front wheels and rear wheels may also be adopted.

The working machine 1 is provided with a hydraulic system (hydraulic circuit) for the working machine shown in FIG. 1. The hydraulic system for the working machine includes a first hydraulic pump P1, a second hydraulic pump P2, and a plurality of control valves 56.

The first hydraulic pump P1 is configured to deliver hydraulic fluid stored in the hydraulic fluid tank 22. In particular, the first hydraulic pump P1 delivers hydraulic fluid that is mainly used for control. The second hydraulic pump P2 is a variable displacement pump disposed at a position different from the first hydraulic pump P1, and is configured to deliver the hydraulic fluid stored in the hydraulic fluid tank 22, and change the flowrate of the hydraulic fluid. Of the hydraulic fluid delivered from the first hydraulic pump P1, the hydraulic fluid used for control is called pilot fluid, and a pressure of the pilot fluid is called a pilot pressure.

A delivery fluid passage 41 is extended from a delivery port of the second hydraulic pump P2 so as to allow the hydraulic fluid delivered from the delivery port to flow therethrough. A plurality of control valves 56 are connected to the delivery fluid passage 41.

Each of the plurality of control valves 56 is shiftable between a plurality of positions (shift positions) and is configured to control hydraulic actuators. The plurality of control valves 56 control the hydraulic actuators including, for example, the boom cylinder 14, the working tool cylinder 15 and an auxiliary actuator (or a reserve actuator) 26 provided in the auxiliary attachment. The plurality of control valves 56 include a boom control valve 56A, a working tool control valve 56B, and a first auxiliary control valve 56C. The boom control valve 56A is a valve to control the boom cylinder 14. The working tool control valve 56B is a valve to control the working tool cylinder 15. The boom control valve 56A and the working tool control valve 56B are three-position switching valves with pilot-operated direct-acting spools. The boom control valve 56A can be shifted among a neutral position 80*c*, a first position 80*a*, and a second position 80*b*. The working tool control valve 56B is shifted among a neutral position 82*c*, a first position 82*a*, and a second position 82*b* by a pilot pressure.

The boom control valve 56A is connected to the boom cylinder 14 via a supply and discharge fluid passage 96, and the working tool control valve 56B is connected to the working tool cylinder 15 via a supply and discharge fluid passage 97.

The boom 10 and bucket 11 can be operated through operation of an operation lever 58 provided around the driver's seat 8. The operation lever 58 is supported to be tiltable back and forth, left and right, and diagonally from a neutral position. The operation lever 58 is provided at a lower portion thereof with pilot valves 59A, 59B, 59C and 59D, so that, through a tilting operation of the operation lever 58, each of the pilot valves 59A, 59B, 59C, and 59D can be operated.

When the operation lever 58 is tilted forward, the pilot valve 59A for lowering the booms 10 is operated, and a pilot pressure for lowering the booms 10 is output from the pilot valve 59A. This pilot pressure acts on a pressure receiving portion of the boom control valve 56A, thereby shifting the boom control valve 56A to the first position 80*a*, and lowering the boom 10.

When the control lever 58 is tilted backward, the pilot valve 59B for raising the booms 10 is operated, and a pilot pressure for raising the booms 10 is output from the pilot valve 59B. This pilot pressure acts on a pressure receiving portion of the boom control valve 56A, thereby shifting the boom control valve 56A to the second position 80*b*, and raising the boom 10.

When the operation lever 58 is tilted rightward, the pilot valve 59C for bucket dumping is operated, and a pilot pressure for dumping movement of the bucket is output from the pilot valve 59C. This pilot pressure acts on a pressure receiving portion of the working tool control valve 56B, thereby shifting the working tool control valve 56B to the first position 82*a*, and moving the bucket 11 in a dumping operation direction.

When the operation lever 58 is tilted leftward, the pilot valve 59D for bucket scooping is operated, and a pilot pressure for scooping movement of the bucket is output from the pilot valve 59D. This pilot pressure acts on the pressure receiving portion of the working tool control valve 56B, thereby shifting the working tool control valve 56B to the second position 82*b*, and moving the bucket 11 in a scooping operation direction.

The first auxiliary control valve 56C is a four-position switching valve with a pilot-operated direct-acting spool configured to control the auxiliary actuator 26. The first auxiliary control valve 56C is shifted among a neutral position 83*c*, a first position 83*a*, a second position 83*b*, and a third position 83*d* by a pilot pressure. That is, the first auxiliary control valve 56C is selectively shifted from the neutral position 83*c* to one of the first, second and third positions 83*a*, 83*b* and 83*d* so as to control a direction, a flowrate, and a pressure of hydraulic fluid supplied to the auxiliary hydraulic actuator 26.

Figure 2:
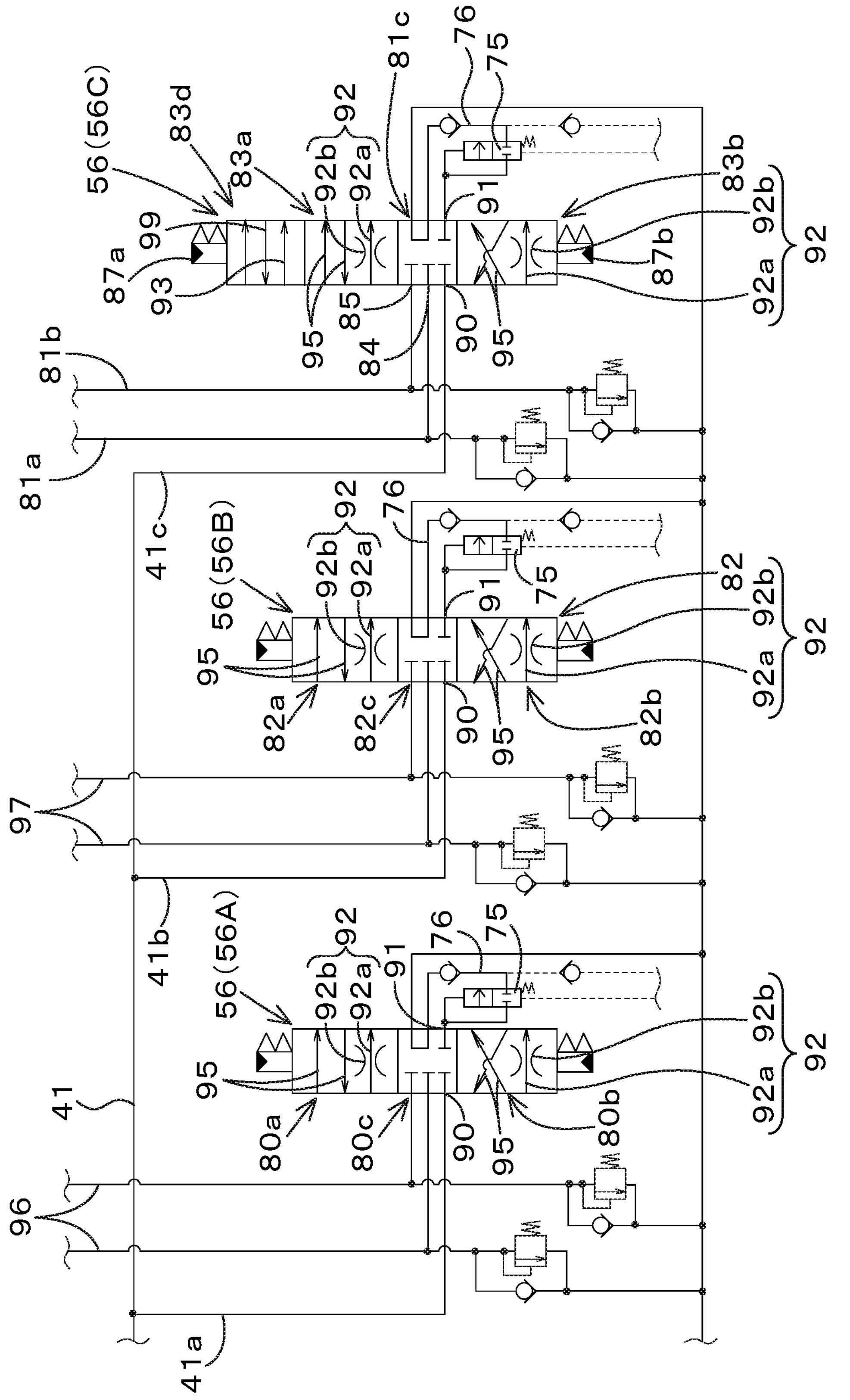
FIG. 2 is an enlarged view of a plurality of control valves.

As shown in FIGS. 1 and 2, the first supply and discharge fluid passage 81*a* and the second supply and discharge fluid passage 81*b* are connected to the first auxiliary control valve 56C. The first supply and discharge fluid passage 81*a* is connected at one end thereof to a first supply and discharge port 84 of the first auxiliary control valve 56C, at an intermediate portion thereof to a connecting member 50, and at the other end thereof to the auxiliary actuator 26. The second supply and discharge fluid passage 81*b* is connected at one end thereof to the second supply and discharge port 85 of the first auxiliary control valve 56C, at an intermediate portion thereof to the connecting member 50, and at the other end thereof to the auxiliary actuator 26.

As shown in FIG. 1, the first auxiliary control valve 56C is operated by a plurality of proportional valves 60. The proportional valves 60 are solenoid valves configured to be magnetized to change opening degrees thereof. The plurality of proportional valves 60 include a first proportional valve 60A and a second proportional valve 60B. The first proportional valve 60A and the second proportional valve 60B are connected to the first hydraulic pump P1 via a fluid passage 100. The proportional valves 60 (first proportional valve 60A and second proportional valve 60B) are fluidly connected to the first auxiliary control valve 56C via respective pilot fluid passages 86. Each of the pilot fluid passages 86 allows the pilot fluid to flow through each of the proportion valves 60A (first and second proportional valves 60A and 60B) to the first auxiliary control valve 56C.

Accordingly, when the first proportional valve 60A is opened, the pilot fluid acts on a pressure receiving portion 87*a* (FIG. 1) of the first auxiliary control valve 56C through the pilot fluid passage 86, and thus a pilot pressure applied to (acting on) the pressure receiving portion 87*a* is determined according to an opening degree of the first proportional valve 60A. When the second proportional valve 60B is opened, the pilot fluid acts on a pressure receiving portion 87*b* of the first auxiliary control valve 56C through the pilot fluid passage 86, and thus a pilot pressure applied to (acting on) the pressure receiving portion 87*b* is determined according to an opening degree of the second proportional valve 60B.

The magnetization or the like of the proportional valves 60 (first proportional valve 60A and second proportional valve 60B) is performed by a controller (first controller) 88. The controller 88 includes a CPU and other components. An operation member 89 such as a switch is operably connected to the controller 88, and the opening degrees of the first proportional valve 60A and the second proportional valve 60B are set based on an operation amount of the operation member 89, thereby causing either the first proportional valve 60A or the second proportional valve 60B to output a pilot pressure applied onto the corresponding pressure receiving portion 87*a* or 87*b* of the first auxiliary control valve 56C. In this manner, the auxiliary actuator 26 can be operated.

The hydraulic system for the working machine is provided with a load sensing system. The load sensing system is configured to control the second hydraulic pump P2 (controls a delivery flowrate of the second hydraulic pump P2) so that a differential pressure between the maximum load pressure and a delivery pressure of the second hydraulic pump P2 becomes constant when the hydraulic actuator is operated. The load sensing system includes pressure compensation valves 75 fluidly connected to the respective control valves 56, a PLS fluid passage 70 connected to the pressure compensation valves 75, a PPS fluid passage 71, a regulator 72, and a tilting piston 73.

When one of the control valves 56 has the highest-loaded pressure, the highest-loaded pressure (PLS signal pressure) is transmitted to the regulator 72 by the PLS fluid passage 70. A delivery pressure of hydraulic fluid of the second hydraulic pump P2 (PPS signal pressure) is transmitted to the regulator 72 by the PPS fluid passage 71. The regulator 72 actuates the tilting piston 73 so that a differential pressure between the PPS signal pressure and the PLS signal pressure (PPS signal pressure−PLS signal pressure) becomes constant.

As shown in FIG. 2, each of the control valves 56 (boom control valve 56A, working tool control valve 56B, first auxiliary control valve 56C) has an input port 90 and an output port 91. The input port 90 is a port to which hydraulic fluid delivered from the second hydraulic pump P2 (variable displacement hydraulic pump) is input. Specifically, the input port 90 of the boom control valve 56A is connected to the delivery fluid passage 41 via a fluid passage 41*a*. The input port 90 of the working machine control valve 56B is connected to the delivery fluid passage 41 via a fluid passage 41*b*. The input port 90 of the first auxiliary control valve 56C is connected to the delivery fluid passage 41 via a fluid passage 41*c*. The output port 91 is a port from which hydraulic fluid input to the input port 90 is output.

In addition, each of the plurality of control valves 56 (boom control valve 56A, working tool control valve 56B, first auxiliary control valve 56C) has a flowrate reduction section 92. The flowrate reduction section 92 is configured to reduce hydraulic fluid input through the input port 90 and to output the hydraulic fluid to the output port 91. In other words, the flowrate reduction section 92 is configured to generate a differential pressure between a pressure of the hydraulic fluid introduced into the input port 90 and a pressure of the hydraulic fluid output from the output port 91. The flowrate reduction section 92 is provided at a reduction position (first positions 80*a*, 82*a*, and 83*a*, second positions 80*b*, 82*b* and 83*b*) that is a specific shift position among a plurality of shift positions of the respective control valves 56 (first positions 80*a*, 82*a*, and 83*a*, second positions 80*b*, 82*b*, and 83*b*, neutral positions 80*c*, 81*c*, and 83*c*, third position 83*d*).

Specifically, the boom control valve 56A includes the flowrate reduction section 92 which functions when the boom control valve 56A is set at either one of the first position 80*a* and the second position 80*b* that serve as the reduction positions of the boom control valve 56A. The working tool control valve 56B includes the flowrate reduction section 92 which functions when the working tool control valve 56B is set at either one of the first position 82*a* and the second position 82*b* that serve as the reduction positions of the working tool control valve 56B. The first auxiliary control valve 56C includes the flowrate reduction section 92 which functions when the first auxiliary control valve 56C is set at either one of the first position 83*a* and the second position 83*b* that serve as the reduction positions of the first auxiliary control valve 56C.

The flowrate reduction section 92 includes an internal fluid passage 92*a* and a throttle portion 92*b*. The internal fluid passage 92*a* fluidly connects the input port 90 to the output port 91 when the flowrate reduction section 92 functions in the corresponding control valve 56 set at the reduction position. The throttle portion 92*b* is provided in the internal fluid passage 92*a* and has a cross-sectional area (opening area) for allowing hydraulic fluid to pass therethrough, which is smaller than that of any other portion of the internal fluid passage 92*a* through which hydraulic fluid passes. The opening area of the throttle portion 92*b* is common to the boom control valve 56A, the working tool control valve 56B, and the first auxiliary control valve 56C.

In each of the boom control valve 56A, the working tool control valve 56B, and the first auxiliary control valve 56C, hydraulic fluid output from the output port 91 returns to the corresponding control valve 56 via a fluid passage 76, passes through a fluid passage (internal fluid passage) 95 other than the flowrate reduction section 92 functionable at the reduction position, and then is output to each of the supply and discharge fluid passages 81*a*, 81*b*, 96, and 97.

In the embodiment as described above, while the plurality of control valves 56 (boom control valve 56A, working tool control valve 56B, first auxiliary control valve 56C) have the respective flowrate reduction sections 92, at least one of the control valves 56 has a flowrate increase section 93. In this embodiment, the first auxiliary control valve 56C has the flowrate increase section 93.

The flowrate increase section 93 is configured to output larger amount of hydraulic fluid to the output port 91 than that output from the flowrate reduction section 92. In other words, the flowrate increase section 93 is configured to generate a differential pressure, as little as possible, between the pressure of hydraulic fluid introduced into the input port 90 and the pressure of hydraulic fluid output from the output port 91. The flowrate increase section 93 fluidly connects the input port 90 to the output port 91 and has an opening area (cross-sectional area) through which hydraulic fluid passes is larger than that of the flowrate reduction section 92. More specifically, in the first auxiliary control valve 56C, the flowrate increase section 93 functions when the auxiliary control valve 56C is at the third position 83*d* that is the increase position of the first auxiliary control valve 56C. The flowrate increase section 93 is configured to allow the substantially maximum amount of hydraulic fluid to pass therethrough when the delivery flowrate of the second hydraulic pump P2 is maximized. The hydraulic fluid output from the first auxiliary control valve 56C passes through a fluid passage (internal fluid passage) 99 other than the flowrate increase section 93 functionable at the increase position, and is output to the first supply and discharge fluid passage 81*a*.

Figure 3:
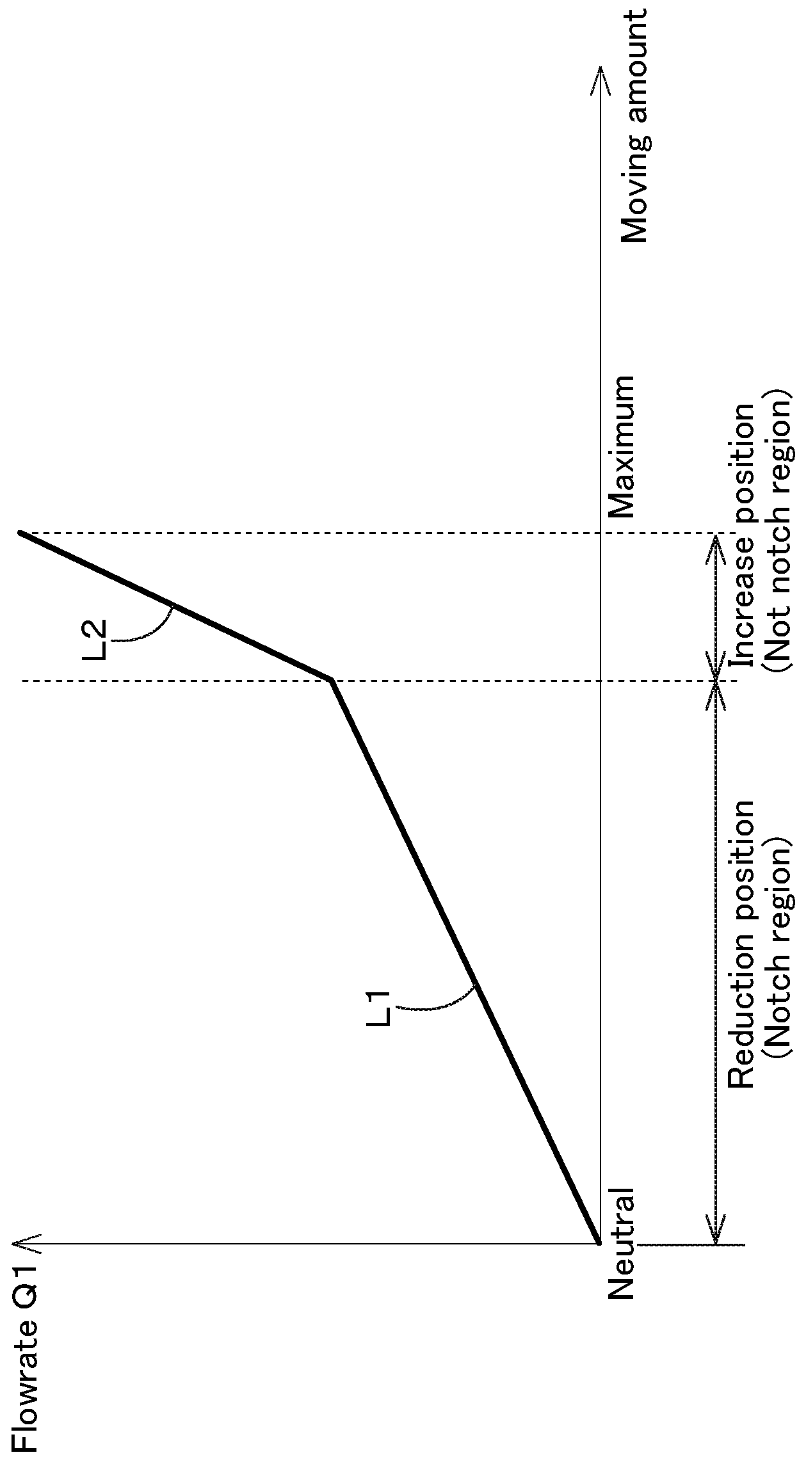
FIG. 3 is a view showing a flowrate Q1 of a first auxiliary control valve.

FIG. 3 shows an example of a flowrate Q1 of hydraulic fluid that passes through the first auxiliary control valve 56C when a spool of the first auxiliary control valve 56C having the flowrate reduction section 92 and the flowrate increase section 93 is operated. In FIG. 3, a horizontal axis represents an amount of movement of the spool, and a vertical axis represents a flowrate of hydraulic fluid output from the output port 91. In description of FIG. 3, it is assumed that the boom control valve 56A and the working machine control valve 56B are not operated.

The controller 88 increases an opening degree of the first proportional valve 60A in accordance with an operation amount of the operation member 89. A pilot pressure acting on the pressure receiving portion 87*a* of the first auxiliary control valve 56C is increased in accordance with increase of the opening degree of the first proportional valve 60A, and is shifted from the neutral position 82C to the first position 83*a*. Here, in the first auxiliary control valve 56C, when the spool is positioned at the reduction position (notch region), that is, the first position 83*a*, the flowrate Q1 of hydraulic fluid gradually increases as rising along a line L1. On the other hand, when the spool passes the first position 83*a* serving as the reduction position (notch region) and reaches the third position 83*d* serving as the increase position (out-of-land region), the flowrate Q1 of the hydraulic fluid increases rapidly as rising along a line L2.

When the first auxiliary control valve 56C is shifted to the increase position and the boom control valve 56A and the working machine control valve 56B are operated, that is, when either the boom control valve 56A or the working machine control valve 5B is shifted to the reduction position (the first position 80*a* or 82*a*, or the second position 80*b* or 82*b*), the controller 88 reduces a value of a signal (control signal) that magnetizes the first proportional valve 60A, i.e., reduces the current, to return the first auxiliary control valve 56C from the increase position (third position 83*d*) to the reduction position (first position 83*a*), even when an operation amount of the operation member 89 is an operation amount corresponding to the increase position. That is, when the boom control valve 56A and the working tool control valve 56B are operated, the controller 88 switches the first auxiliary control valve 56C from the increase position to the reduction position (first position 83*a*) by decreasing a stroke of the spool from the neutral position 83*c*.

The hydraulic system for the working machine according to the first embodiment described above, includes the variable displacement hydraulic pump (second hydraulic pump) P2 to deliver hydraulic fluid having a variable flowrate, the plurality of hydraulic actuators (boom cylinder 14, working tool cylinder 15, auxiliary actuator 26) actuated with hydraulic fluid, and the plurality of control valves 56 (56A, 56B, 56C) each of which is shiftable among a plurality of positions so that the control valve 56, when shifted to a shift position serving as one of the positions, controls a flowrate of hydraulic fluid flowing to the corresponding hydraulic actuator in correspondence to the shift position. Each of the control valves 56 (56A, 56B, 56C) includes the input port 90 into which hydraulic fluid delivered from the variable displacement hydraulic pump P2 is input, the output port 91 from which the hydraulic fluid input into the input port 90 is output, and the flowrate reduction section 92 configured so that, when the control valve 56 is shifted to the reduction position serving as a specific one of the shift positions, the flowrate reduction section 92 reduces a flowrate of the hydraulic fluid entering the input port 90 and outputs the flowrate-reduced hydraulic fluid to the output port 91. At least one control valve 56C among the plurality of control valves 56 (56A, 56B, and 56C) includes the flowrate increase section 93 configured so that, when the control valve 56 is shifted to the increase position serving as another shift position different from the reduction position, the flowrate increase section 93 outputs the hydraulic fluid having entered the input port 90 to the output port 91 at the flowrate larger than that of hydraulic fluid output by the flowrate reduction section 92.

According to this configuration, by switching each of the hydraulic actuators (boom cylinder 14, working tool cylinder 15, and auxiliary control actuator 26) to the reduction position corresponding to the flowrate reduction section 92 in the corresponding control valve 56, hydraulic fluid having the amount required for the hydraulic actuators (boom cylinder 14, working tool cylinder 15, and auxiliary actuator 26) can be supplied by the variable displacement hydraulic pump (second hydraulic pump) P2 as usual. On the other hand, by switching the corresponding control valve 56 to the increase position corresponding to the flowrate increase section 93, hydraulic fluid having the larger amount can be supplied to the corresponding hydraulic actuator (boom cylinder 14, working tool cylinder 15, or auxiliary actuator 26) by the variable displacement hydraulic pump (second hydraulic pump) P2. That is, since at least one control valve 56 (56C) among the plurality of control valves 56 (56A, 56B, and 56C) includes the flowrate increase section 93, the LS differential pressure generated by activating the variable displacement hydraulic pump (second hydraulic pump) P2 can be made to be substantially zero, and accordingly the horsepower loss can be easily reduced as much as possible.

The plurality of hydraulic actuators include the boom cylinder 14, the working tool cylinder 15, and the auxiliary actuator 26. The plurality of control valves 56 include the boom control valve 56A for controlling the boom cylinder 14, the working tool control valve 56B for controlling the working tool cylinder 15, and the first auxiliary control valve 56 for controlling the auxiliary actuator, each of the boom control valve 56A and the working tool control valve 56B includes the flowrate reduction section 92, and the first auxiliary control valve 56C includes the flowrate reduction section 92 and the flowrate increase section 93.

According to this configuration, when the boom cylinder 14 (boom 10) and the working tool cylinder 15 (working tool such as the bucket 11) are operated, the boom control valve 56A and the working tool control valve 56B allow the boom 10 and the working tool such as the bucket 11 to be operated according to loads on the boom cylinder 14 and the working tool cylinder 15. On the other hand, when a large-displacement auxiliary actuator that requires a large-amount of hydraulic fluid (auxiliary actuator with large-displacement) is attached to the working machine 1, the first auxiliary control valve 56C can operate the large-displacement auxiliary actuator 26. In addition, when the auxiliary actuator 26 that operates with hydraulic fluid having a standard amount (standard auxiliary actuator) is attached to the working machine 1, the auxiliary actuator 26 can be operated as usual.

The first auxiliary control valve 56C having been shifted to the increase position returns from the increase position to the reduction position when either the boom control valve 56A or the working tool control valve 56B is shifted to the reduction position. According to this configuration, the working tools 11 such as the boom 10 and the bucket are allowed to be operated while operating the auxiliary actuator 26. In other words, when the boom 10 and the working tool such as the bucket 11 are operated, hydraulic fluid can be prevented from being concentrated only to the auxiliary actuator 26, and accordingly work can be performed in a well-balanced condition.

Second Embodiment

Figure 4A:
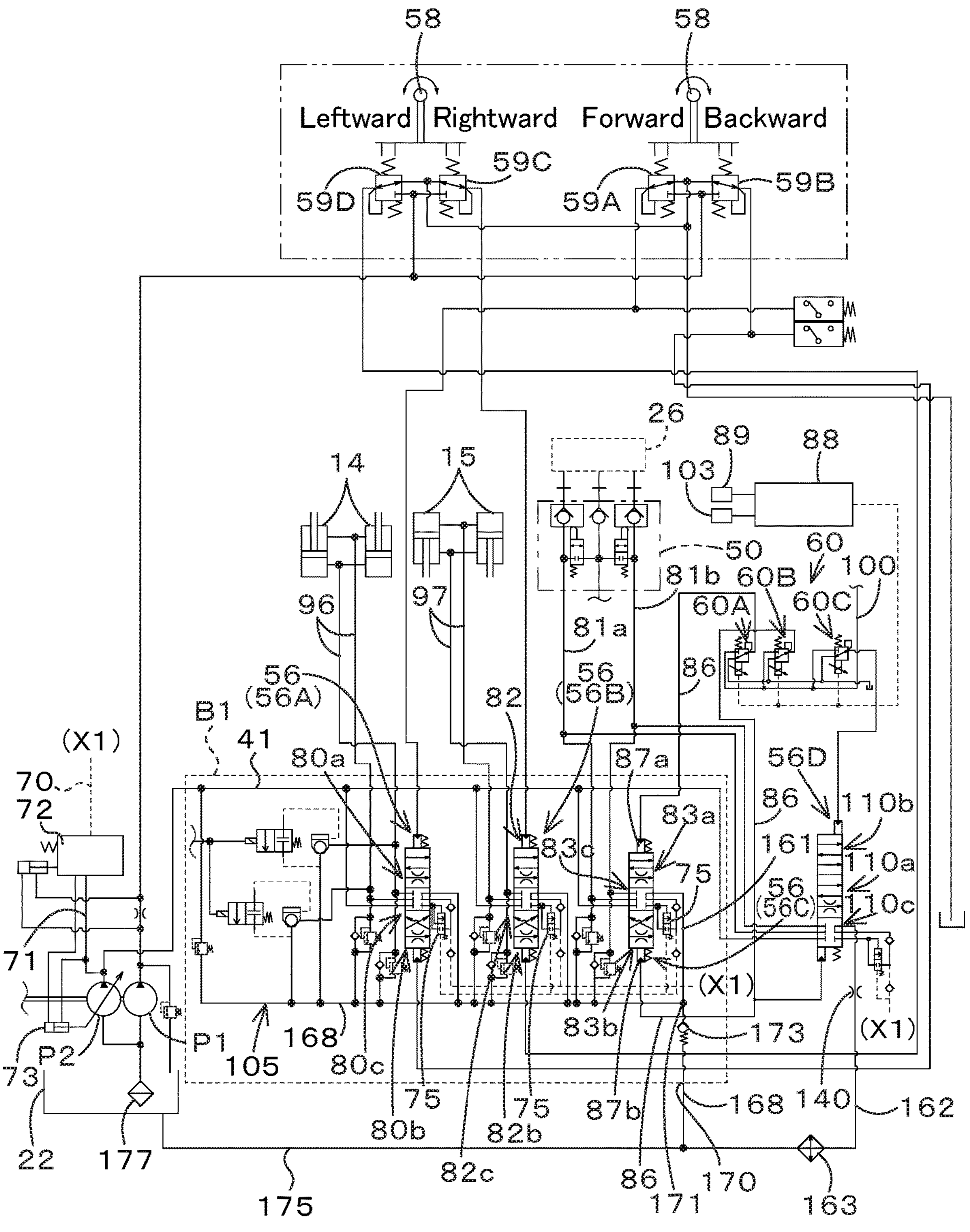
FIG. 4A is a schematic view of a hydraulic system for a working machine according to a second embodiment.
Figure 4B:
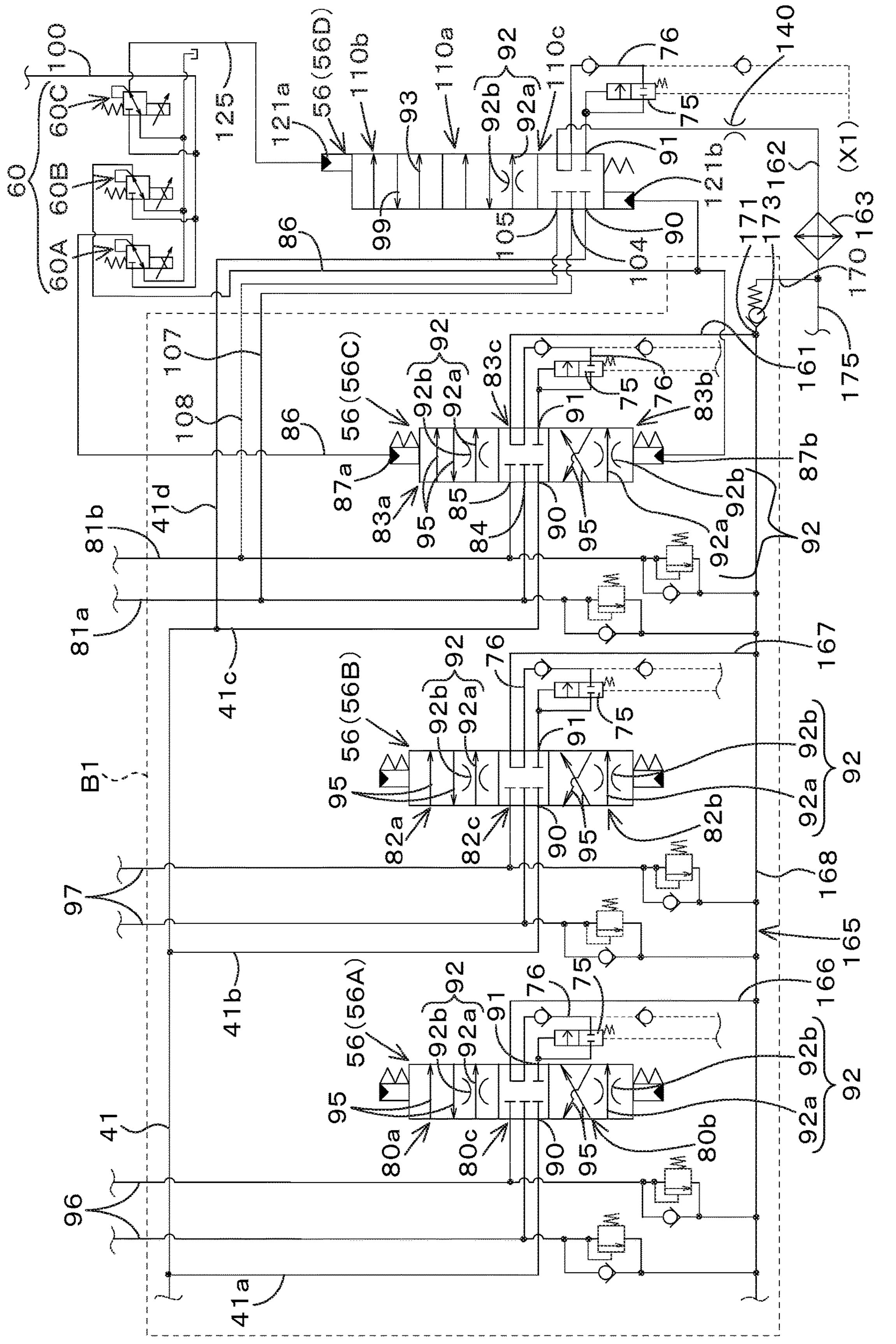
FIG. 4B is an enlarged view of a plurality of control valves.

A hydraulic system for a working machine according to a second embodiment shown in FIGS. 4A and 4B is a modified example of the auxiliary control valve. As shown in FIGS. 4A and 4B, the boom control valve 56A and the working machine control valve 56B are the same as the boom control valve 56A and the working machine control valve 56B according to the first embodiment described above. In addition, the hydraulic system for the working machine according to the second embodiment includes similar configurations to the hydraulic system for the working machine according to the first embodiment. Only the configurations according to the second embodiment different from those according to the first embodiment will be described below.

As shown in FIGS. 1, 4A, and 4B, the plurality of control valves 56 includes a second auxiliary control valve 56D in addition to the boom control valve 56A, the working tool control valve 56B, and the first auxiliary control valve 56C. The first auxiliary control valve 56C is a pilot-operated three-position switching valve with a direct-acting spool that is shifted among the neutral position 83*c*, the first position 83*a*, and the second position 83*b*, and includes the flowrate reduction section 92 which functions when the first auxiliary control valve 56C is set at either the first position 83*a* or the second position 83*b*. That is, in the second embodiment, the first auxiliary control valve 56C is not provided with the flowrate increase section 93.

The second auxiliary control valve 56D is a pilot-operated three-position switching valve with a direct-acting spool and is configured to control the auxiliary actuator 26 in the same way as the first auxiliary control valve 56C. The second auxiliary control valve 56D is shifted among a first position 110*a*, a second position 110*b*, and a neutral position 110*c* by a pilot pressure. That is, the second auxiliary control valve 56D is selectively shifted from the neutral position 110*c* to either the first or second position 110*a* or 110*b* so as to control a direction, flowrate, and pressure of the hydraulic fluid supplied to the auxiliary hydraulic actuator 26.

The second auxiliary control valve 56D includes the input port 90, the output port 91, a third supply and discharge port 104, a fourth supply and discharge port 105, the flowrate reduction section 92, and a flowrate increase section 93.

In the second auxiliary control valve 56D, the input port 90 is connected to a fluid passage 41*d* that is branched from the delivery fluid passage 41. The third supply and discharge port 104 is connected to a first supply and discharge fluid passage 81*a* via a fluid passage (third supply and discharge fluid passage) 107, and the fourth supply and discharge port 105 is connected to a second supply and discharge fluid passage 81*b* via a fluid passage (fourth supply and discharge fluid passage) 108. The input port 90 of the second auxiliary control valve 56D is connected to the delivery fluid passage 41 via the fluid passage 41*d*.

In addition, in the second auxiliary control valve 56D, the flowrate reduction section 92 is configured to function when the second auxiliary control valve 56D is set at the first position 110*a* serving as the reduction position of the second auxiliary control valve 56D. The flowrate increase section

93 is configured to function when the second auxiliary control valve 56D is set at the second position 110*b* serving as the increase position of the second auxiliary control valve 56D. In the second auxiliary control valve 56D, hydraulic fluid output from the output port 91 returns from the fluid passage 76 to the second auxiliary control valve 56D, passes through a fluid passage (internal fluid passage) 99 other than the flowrate increase section 93 functionable at the increase position, and is output to the first supply and discharge fluid passage 81*a*.

The second auxiliary control valve 56D includes a first pressure receiving portion 121*a* and a second pressure receiving portion 121*b*. The first pressure receiving portion 121*a* is connected, via a fluid passage 125, to a third proportional valve 60C that is one of the plurality of proportional valves 60. A fluid passage 100 is connected to the third proportional valve 60C, and hydraulic fluid delivered from the first hydraulic pump P1 is supplied to the third proportional valve 60C through the fluid passage 100.

The second pressure receiving portion 121*b* of the second auxiliary control valve 56D is connected to the pilot fluid passage 86. That is, the pressure receiving portion 87*b* of the first auxiliary control valve 56C is connected to the second pressure receiving portion 121*b* of the second reserve control valve by the pilot fluid passage 86.

As shown in FIG. 4A and the like, the first auxiliary control valve 56C is operated by the plurality of proportional valves 60. The proportional valves 60 are solenoid valves configured to be magnetized to change opening degrees thereof. The plurality of proportional valves 60 include the first proportional valve 60A, the second proportional valve 60B, and the third proportional valve 60C. The first proportional valve 60A, the second proportional valve 60B, and the third proportional valve 60C are connected to the first hydraulic pump P1 via the fluid passage 100.

The first proportional valve 60A and the second proportional valve 60B are connected to the first auxiliary control valve 56C by the respective pilot fluid passages 86. Each of the pilot fluid passages 86 allows the pilot fluid to flow through each of the first proportional valve 60A and the second proportional valve 60B to the first auxiliary control valve 56C.

Accordingly, when the first proportional valve 60A is opened, the pilot fluid acts on the pressure-receiving portion 87*a* of the first auxiliary control valve 56C through the pilot fluid passage 86, and a pilot pressure to be applied to (acting on) the pressure-receiving portion 87*a* is determined according to an opening degree of the first proportional valve 60A. In addition, when the second proportional valve 60B is opened, a pilot fluid acts on the pressure-receiving portion 87*b* of the first auxiliary control valve 56C through the pilot fluid passage 86, and a pilot pressure to be applied to (acting on) the pressure-receiving portion 87*b* is determined according to an opening degree of the second proportional valve 60B. In addition, when the third proportional valve 60C is opened, a pilot fluid acts on the pressure-receiving portion 121*a* of the second auxiliary control valve 56D through the pilot fluid passage 125, and a pilot pressure to be applied to (acting on) the pressure-receiving portion 121*a* is determined according to an opening degree of the third proportional valve 60C.

The magnetization and the like of the proportional valves 60 (first proportional valve 60A, second proportional valve 60B, third proportional valve 60C) is performed by a controller (first controller) 88. The controller 88 includes a CPU and the like. The operation member 89 such as a switch is operably connected to the controller 88, and opening degrees of the first proportional valve 60A, the second proportional valve 60B, and the third proportional valve 60C are set based on an operation amount of the operation member 89. When a pilot pressure output from either the first proportional valve 60A or the second proportional valve 60B is applied onto the corresponding pressure-receiving portion 87*a* or 87*b* of the first auxiliary control valve 56C, and when a pilot pressure output from the third proportional valve 60C is applied onto the first pressure-receiving portion 121*a* of the third proportional valve 60C, the auxiliary actuator 26 can be operated.

Figure 5:
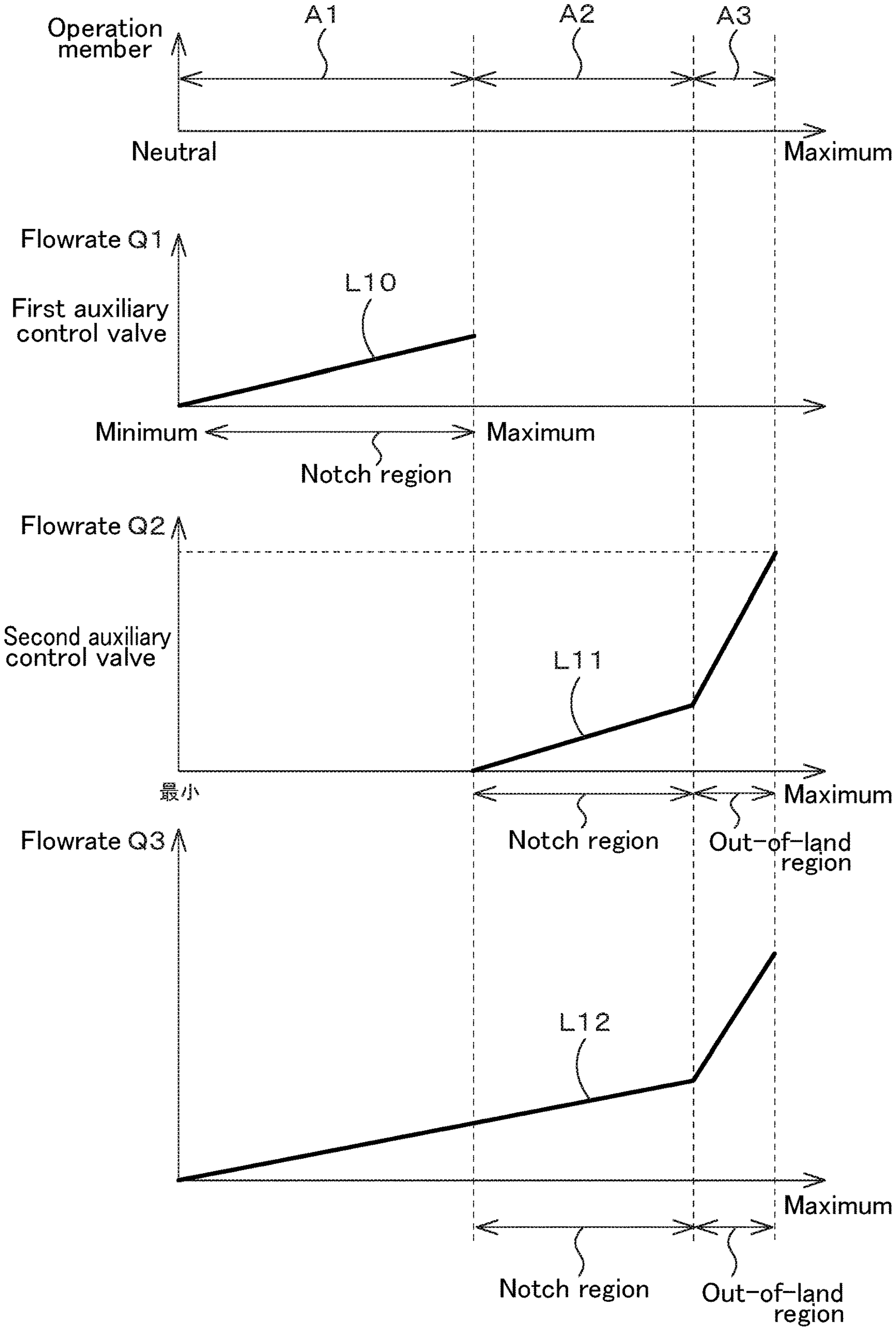
FIG. 5 is a view showing a flowrate Q3 that is a total of a flowrate Q1 of the first auxiliary control valve and a second rate Q2 of the second auxiliary control valve.

FIG. 5 shows a relationship among the flowrate Q1 of hydraulic fluid flowing through the first auxiliary control valve 56C when a spool of the first auxiliary control valve 56C is operated, a flowrate Q2 of hydraulic fluid flowing through the first auxiliary control valve 56C when a spool of the second auxiliary control valve 56D is operated, and a flowrate Q3 of the hydraulic fluid flowing through the first supply and discharge fluid passage 81*a*. In FIG. 5, it is assumed that the boom control valve 56A and the working tool control valve 56B are not operated.

When an operation amount of the operation member 89 is in a first range (small to medium amount range) A1 (less than a threshold), the controller 88 increases only an opening degree of the first proportional valve 60A in accordance with increase of the operation amount. In this case, since the first auxiliary control valve 56C is set at the first position 83*a* serving as the reduction position (notch region), the flowrate Q1 of hydraulic fluid gradually increases as rising along a line L10. In addition, when an operation amount of the operation member 89 is in a second range (medium to slightly high amount range) A2 (less than a threshold), the controller 88 increases an opening degree of the third proportional valve 60C according to increase of the operation amount while gradually increasing the opening degree of the first proportional valve 60A. In this case, since the second auxiliary control valve 56D is set at the first position 110*a* serving as the reduction position (notch range), the flowrate Q2 of hydraulic fluid gradually increases as rising along a line L11, and the total flowrate Q3 also gradually increases as rising along a line L12.

In addition, when an operation amount of the operation member 89 is the threshold or more, that is, the operation amount is in a third range (slightly high to the maximum amount range) A3, the opening degree of the third proportional valve 60C is maximized. Since the second auxiliary control valve 56D is set at the second position 110*b* serving as the increase position (out-of-land range), the total flowrate Q3 increases to the maximum as rising along the line L12.

When the second auxiliary control valve 56D is shifted to the second position 110*b* serving as the increase position (out-of-land region) and the boom control valve 56A and the working tool control valve 56B are operated, the controller 88 lowers a value of a control signal (current) to be output to the third proportional valve 60C to make the second auxiliary control valve 56D back to the first position 110*a* serving as the reduction position (notch area) or to the neutral position 110*c*. Since the second pressure receiving portion 121*b* of the second auxiliary control valve 56D is connected to the pilot fluid passage 86, the second auxiliary control valve 56D can be forced to return to the neutral position 110*c* when the first auxiliary control valve 56C is shifted to the second position 83*b* with a pressure of pilot fluid (pilot pressure) output from the first proportional valve 60A.

In the second embodiment described above, the plurality of control valves 56 include the boom control valve 56A, the working tool control valve 56B, the first auxiliary control valve 56C, and the second auxiliary control valve 56D. Each of the boom control valve 56A, the working tool control valve 56B, and the first auxiliary control valve 56C includes the flowrate reduction section 92. The second auxiliary control valve 56D includes the flowrate increase section 93.

According to this configuration, of the first and second auxiliary control valves 56C and 56D, the first auxiliary control valve 56C is configured to actuate a standard auxiliary actuator while the second auxiliary control valve 56D is configured to actuate a large-displacement auxiliary actuator. That is, the at least two auxiliary control valves, i.e., the first and second auxiliary control valves 56C and 56D, are configured to actuate the auxiliary actuator 26 whether it is the standard auxiliary actuator 26 or the large-displacement auxiliary actuator 26. In particular, the at least two auxiliary control valves, the first auxiliary control valve 56C and the second auxiliary control valve 56D, can be used to change the flowrate of the hydraulic fluid supplied to the reserve actuator 26 between the reduced flowrate corresponding to the flowrate reduction section 92 and the increased flowrate corresponding to the flowrate increase section 93. Thus, an apparent moving amount of the spool (the sum of a moving amount of the spool of the first auxiliary control valve 56C and a moving amount of the spool of the second auxiliary control valve 56D) becomes longer, and accordingly accuracy of the flow control of hydraulic fluid can be improved.

In addition, the hydraulic system for the working machine according to the second embodiment includes the operation member 89 for operating the auxiliary actuator 26. The first auxiliary control valve 56C is shifted to the reduction position when the operation amount of the operation member 89 is less than the threshold. The second auxiliary control valve 56D is shifted to the increase position when the operation amount of the operation member 89 is not less than the threshold.

According to this configuration, for example, as shown in FIG. 5, when the operation amount of the operation member 89 is less than the threshold (first range A1 (small to medium amount range) and second range A2 (medium to slightly high amount range), the auxiliary actuator (whether it is the mainly-used auxiliary actuator or the large-displacement auxiliary actuator) 26 can be moved precisely and finely in correspondence to the operation amount. In addition, when the operation amount of the operation member 89 is the threshold or more (third range A3 (slightly high to the maximum amount range)), the large-displacement auxiliary actuator 26 can be operated.

The second auxiliary control valve 56D includes the flowrate reduction section 92. The second auxiliary control valve 56D having been shifted to the increase position is returned from the increase position to the reduction position when either the boom control valve 56A or the working tool control valve 56B is shifted to the reduction position. According to this configuration, the auxiliary actuator 26 can be operated while the boom 10 and the working tool 11 such as a bucket are operated. In other words, in a case where the boom 10 and the working tool 11 such as a bucket are operated, hydraulic fluid can be prevented from being concentrated only to the auxiliary actuator 26, and the work can be performed in a well-balanced condition.

As shown in FIG. 4B, the hydraulic system for the working machine according to the second embodiment includes a first discharge fluid passage 161 and a second discharge fluid passage 162. The first discharge fluid passage 161 is connected to the first auxiliary control valve 56C so as to be configured to discharge hydraulic fluid flowing through either the first supply and discharge fluid passage 81*a* or the second supply and discharge fluid passage 81*b*. For example, when the first auxiliary control valve 56C is in the first position 83*a*, the first discharge fluid passage 161 is connected to the second supply and discharge port 85 so as to discharge hydraulic fluid flowing through the second supply and discharge fluid passage 81*b*. In addition, when the first auxiliary control valve 56C is in the second position 83*b*, the first discharge fluid passage 161 is connected to the first supply and discharge port 84 so as to discharge hydraulic fluid flowing through the first supply and discharge fluid passage 81*a*.

The second discharge fluid passage 162 is connected to the second auxiliary control valve 56D so as to be configured to discharge hydraulic fluid flowing through either the third supply and discharge fluid passage 107 or the fourth supply and discharge fluid passage 108. For example, when the second auxiliary control valve 56D is in the first position 110*a*, the second discharge fluid passage 162 is connected to the fourth supply and discharge port 105 so as to discharge hydraulic fluid flowing through the second supply and discharge fluid passage 81*b*. In addition, when the second auxiliary control valve 56D is in the second position 83*b*, the second discharge fluid passage 162 is connected to the third supply and discharge port 104 so as to discharge hydraulic fluid flowing through the first supply and discharge fluid passage 81*a*.

An oil cooler 163 is connected to the second discharge fluid passage 162. On the second discharge fluid passage 162, a throttle portion 140 is provided upstream of the oil cooler 163. The oil cooler 163 cools hydraulic fluid that has passed through the second auxiliary control valve 56D.

The boom control valve 56A, the working tool control valve 56B, and the first auxiliary control valve 56C described above are provided in a hydraulic control unit B1. A housing of the hydraulic control unit B1 is formed of cast metal or the like, and the boom control valve 56A, the working tool control valve 56B, and the first auxiliary control valve 56C are provided inside the housing. In addition, the hydraulic control unit B1 is provided with all or some of the fluid passages (delivery fluid passage 41, fluid passages 41*a*, 41*b*, and 41*c*, supply and discharge fluid passages 96, 97, 81*a*, 81*b*, and 161, and pilot fluid passage 86) leading to the boom control valve 56A, the working tool control valve 56B, and the first auxiliary control valve 56C.

In detail, a discharge passage 165 is formed in the hydraulic control unit B1. The discharge passage 165 includes a first discharge fluid passage 161 connected to the first auxiliary control valve 56C, a fourth discharge fluid passage 166 connected to the boom control valve 56A, a fifth discharge fluid passage 167 connected to the working tool control valve 56B, and a sixth discharge fluid passage 168 connecting the first discharge fluid passage 161, the fourth discharge fluid passage 166, and the fifth discharge fluid passage 167 to one another. The sixth discharge fluid passage 168 is connected to a discharge port 170 of the hydraulic control unit. That is, the first discharge fluid passage 161 is connected to the discharge port 170 via the sixth discharge fluid passage 168.

The first discharge fluid passage 161 and the sixth discharge fluid passage 168 are connected by a connecting portion 171. A check valve 173 is provided between the connecting portion 171 and the discharge port 170 to allow hydraulic fluid to flow from the connecting portion 171 to the discharge port 170 and to prevent the hydraulic fluid from flowing from the discharge port 170 to the connecting portion 171.

The discharge port 170 of the hydraulic control unit B1 is connected to the hydraulic fluid tank 22 by a third discharge fluid passage 175. The second discharge fluid passage 162 is connected to the second auxiliary control valve 56D and the third discharge fluid passage 175. In the above-described embodiment, the third discharge fluid passage 175 is connected to the hydraulic fluid tank 22, however, the third discharge fluid passage 175 may be connected to a suction portion 177 of the hydraulic pumps (first hydraulic pump P1, second hydraulic pump P2).

The hydraulic fluid discharged from the boom control valve 56A, the working tool control valve 56B, and the first auxiliary control valve 56C flows through the sixth discharge fluid passage 168 and the discharge port 170 to the hydraulic fluid tank 22. On the other hand, the hydraulic fluid discharged from the second auxiliary control valve 56D is cooled by the oil cooler 163, and then flows to either the hydraulic fluid tank 22 or the suction section 177.

Figure 4C:
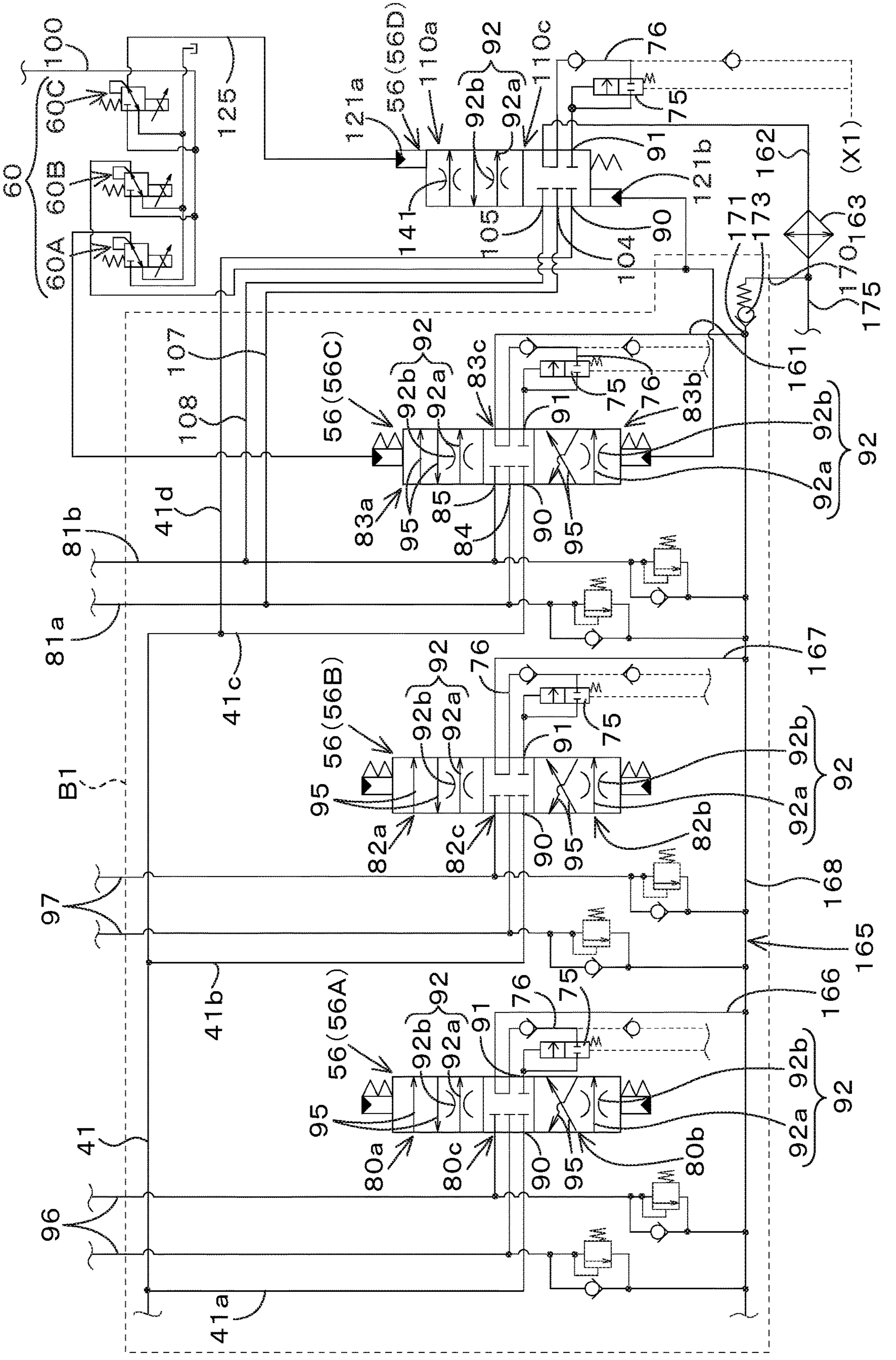
FIG. 4C is a view showing a modified example of the second embodiment.

In the second embodiment described above, the second auxiliary control valve 56D is a control valve having the flowrate increase section 93, however, as shown in FIG. 4C, the second auxiliary control valve 56D may be a three-position switching valve having a flowrate reduction section 92 without the flowrate increase section 93, similar to the first auxiliary control valve 56C. In addition, the second auxiliary control valve 56D is not limited to these configurations.

Figure 4D:
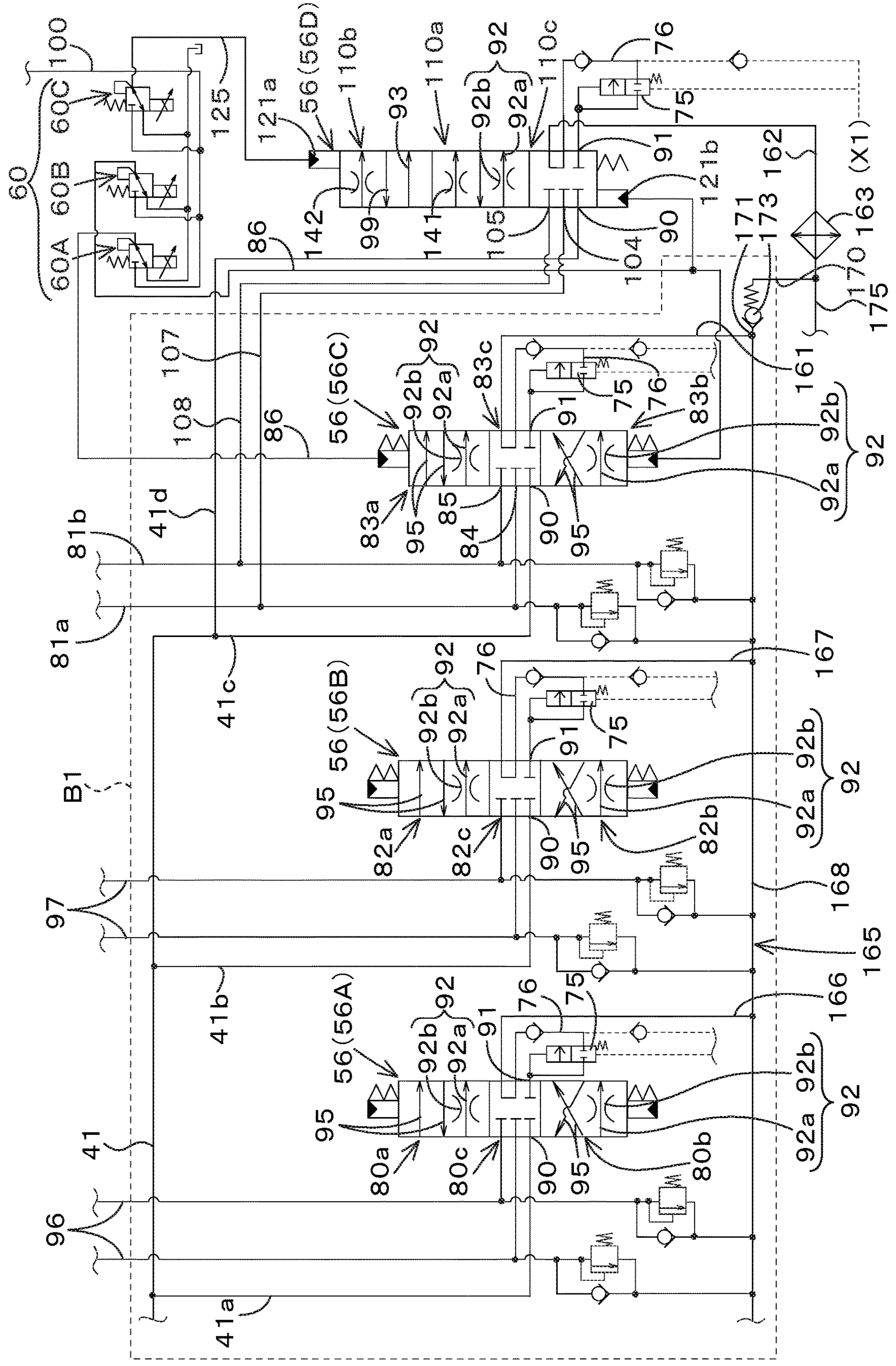
FIG. 4D is a view showing a modified example of a second auxiliary control valve.
Figure 4E:
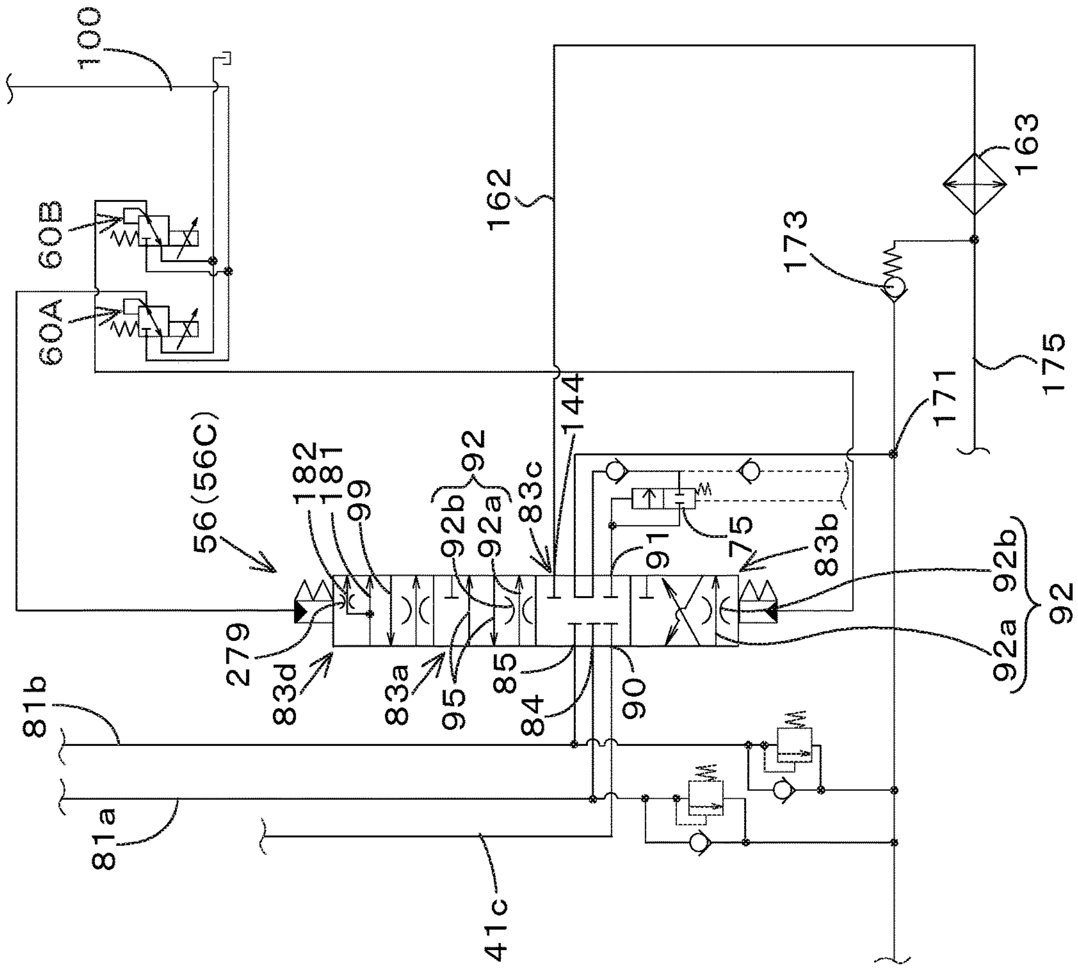
FIG. 4E is a view showing a modified example of the auxiliary control valve and a proportional valve.
Figure 4F:
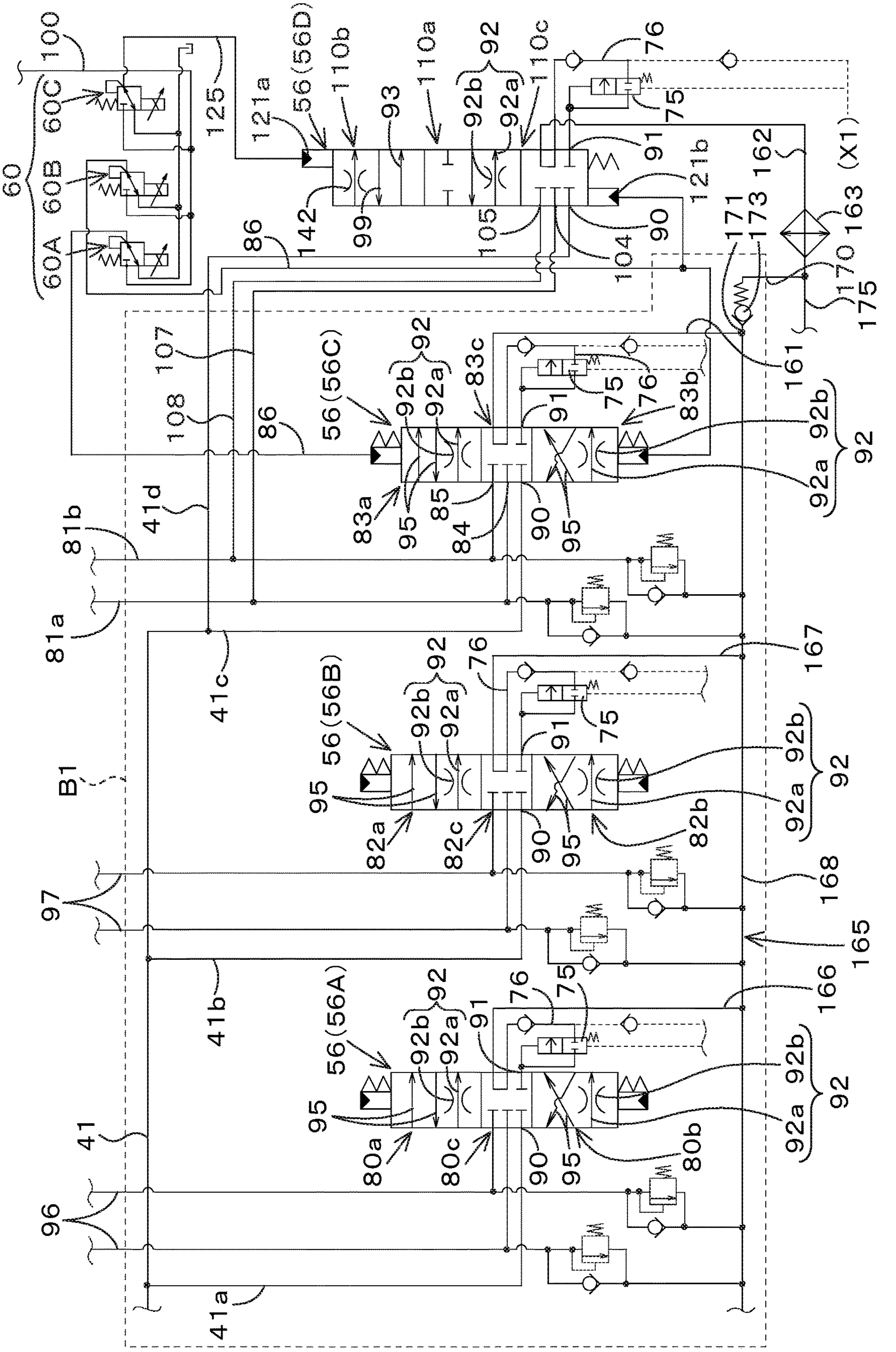
FIG. 4F is a view showing a modified example of the second auxiliary control valve.

In the second embodiment, as shown in FIG. 4A, the second discharge fluid passage 162 includes the throttle portion 140, however, not limited to this configuration. Alternatively, the fluid passage connected to the oil cooler 163 may include a throttle portion. For example, as shown in FIG. 4D, a fluid passage that functions in the second auxiliary control valve 56D when disposed at the first position 110*a* may include a throttle portion 141, or a fluid passage that functions in the second auxiliary control valve 56D when disposed at the second position 110*b* may include a throttle portion 142. These internal fluid passages of the second auxiliary control valve 56D are configured to be connected to the oil cooler 163. In addition, as shown in FIG. 4F, when the second auxiliary control valve 56D is shifted to the first position 110*a*, the second auxiliary control valve 56D may be configured to block the flow of hydraulic fluid (i.e., to interrupt the fluidal connection between the input port and the output port).

The hydraulic system for the working machine according to the second embodiment includes the hydraulic pumps P1 and P2 to deliver hydraulic fluid, the boom control valve 56A for controlling the boom cylinder 14, the working tool control valve 56B for controlling the working tool cylinder 15, the first auxiliary control valve 56C for controlling the auxiliary actuator 26, the second auxiliary control valve 56D for controlling the auxiliary actuator 26, the first supply and discharge fluid passage 81*a* fluidly connecting the auxiliary actuator 26 to the first auxiliary control valve 56C, the second supply and discharge fluid passage 81*b* fluidly connecting the auxiliary actuator 26 to the first auxiliary control valve 56C, the third supply and discharge fluid passage 107 fluidly connecting the first supply and discharge fluid passage 81*a* to the second auxiliary control valve 56D, the fourth supply and discharge fluid passage 108 fluidly connecting the second supply and discharge fluid passage 81*b* to the second auxiliary control valve 56D, the first discharge fluid passage 161 fluidly connected to the first auxiliary control valve 56C so as to discharge hydraulic fluid flowing in either the first supply and discharge fluid passage 81*a* or the second supply and discharge fluid passage 81*b*, the second discharge fluid passage 162 fluidly connected to the second auxiliary control valve 56D so as to discharge hydraulic fluid flowing in either the third supply and discharge fluid passage 107 or the fourth supply and discharge fluid passage 108, and the oil cooler 163 fluidly connected to the second discharge fluid passage 162.

According to this configuration, by activating the second auxiliary control valve 56D, the hydraulic fluid to be supplied to the auxiliary actuator 26 can be easily increased (increased in volume) by supplying the hydraulic fluid output from the second auxiliary control valve 56D to the first or second supply and discharge fluid passage 81*a* or 81*b* connected to the first auxiliary control valve 56C. Specifically, when hydraulic fluid supplied to the auxiliary actuator 26 is increased to operate the auxiliary actuator 26, both the first and second auxiliary control valves 56C and 56D are actuated, thereby enabling fine operation of the auxiliary actuator 26. In addition, hydraulic fluid that returning from the auxiliary actuator 26 to the second auxiliary control valve 56D can be easily cooled by passing through the oil cooler 163. In other words, an apparent moving amount of the spool (the sum of a moving amount of the spool of the first auxiliary control valve 56C and a moving amount of the spool of the second auxiliary control valve 56D) becomes longer, and accordingly accuracy of the flow control of hydraulic fluid can be improved. In addition, when the hydraulic fluid to be supplied to the auxiliary actuator 26 is increased in volume, the hydraulic fluid can be cooled by the oil cooler 163.

In addition, the hydraulic system for the working machine according to the second embodiment includes the hydraulic fluid tank 22 storing hydraulic fluid, the suction portion 177 of the hydraulic pumps P1 and P2, and the hydraulic pressure control unit B1 incorporating the boom control valve 56A, the working tool control valve 56B, the first auxiliary control valve 56C, and including the discharge port 170 for discharging hydraulic fluid therefrom. The first discharge fluid passage 161 is fluidly connected to the discharge port 170 of the hydraulic pressure control unit B1. The second discharge fluid passage 162 is fluidly connected to the discharge port 170 and to the third discharge fluid passage 175 fluidly connected to either the hydraulic fluid tank 22 or the suction portion 177.

According to this configuration, in a case where the first auxiliary control valve 56C is activated, hydraulic fluid can be discharged through the third discharge fluid passage 175 from the first discharge fluid passage 161 connected to the discharge port 170 of the hydraulic control unit B1. On the other hand, in a case where the second auxiliary control valve 56D is activated, hydraulic fluid can be discharged through the second discharge fluid passage 162 including the oil cooler 163. That is, in a case where the first auxiliary control valve 56C alone operates the auxiliary actuator 26, hydraulic fluid can be returned (drained) to the hydraulic pump P1 and P2 side without passing through the oil cooler 163, when there is no need to cool the hydraulic fluid because an amount of hydraulic fluid to be supplied to the auxiliary actuator 26 is small and heat generation is also small. In addition, in a case where the auxiliary actuator 26 is operated by the second auxiliary control valve 56D (or the first and second auxiliary control valves 56C and 56D), an amount of hydraulic fluid to be supplied to the auxiliary actuator 26 is increased and the heat generation becomes large, so that the hydraulic fluid can be returned to the hydraulic pumps P1 and P2 side through the oil cooler 163.

Each of the first and second auxiliary control valves 56C and 56D is shiftable among the plurality of shift positions and includes a pressure-receiving portion to which a pilot pressure is applied. The pressure-receiving portion of the first auxiliary control valve 56C and the pressure-receiving portion of the second auxiliary control valve 56D are fluidly connected to each other via a pilot fluid passage, and the second auxiliary control valve 56D is shiftable to the neutral position serving as one of the shift positions when a pressure is applied to the pressure-receiving portion thereof via the pilot fluid passage.

According to this configuration, the auxiliary actuator 26 is also operated while operating the boom 10 and the working tool 11 such as the bucket. In other words, when operating the boom 10 and the working tool 11 such as the bucket, hydraulic fluid can be prevented from being concentrated only to the auxiliary actuator 26, and thus work can be performed in a well-balanced condition.

Each of the first and second auxiliary control valves 56C and 56D is shiftable among the plurality of shift positions, and includes the input port 90 into which hydraulic fluid delivered from the variable displacement hydraulic pump is input the output port 91 from which the hydraulic fluid input into the input port 90 is output, and the flowrate reduction section configured so that, when each of the first and second auxiliary control valves 56C and 56D is shifted to the reduction position serving as a specific one of the shift positions, the flowrate reduction section 92 reduces a flowrate of the hydraulic fluid entering the input port 90 and outputs the flowrate-reduced hydraulic fluid to the output port 91, and the second auxiliary control valve 56D includes the flowrate increase section 93 configured so that, when the second auxiliary control valve 56D is shifted to the increase position serving as another specific shift position different from the reduction position, the flowrate increase section 93 outputs the hydraulic fluid having entered the input port 90 to the output port 91 at a flowrate larger than that of hydraulic fluid output by the flowrate reduction section 92.

According to this configuration, when an auxiliary actuator that operates with standard amount of hydraulic fluid (standard auxiliary actuator) is attached to the control valves 56C and 56D, the auxiliary actuator can be normally operated by the first control valve 56C. On the other hand, when a large-displacement auxiliary actuator that requires a large amount of hydraulic fluid is attached, the second auxiliary control valve 56D can operate the large-displacement auxiliary actuator.

Third Embodiment

Figure 6A:
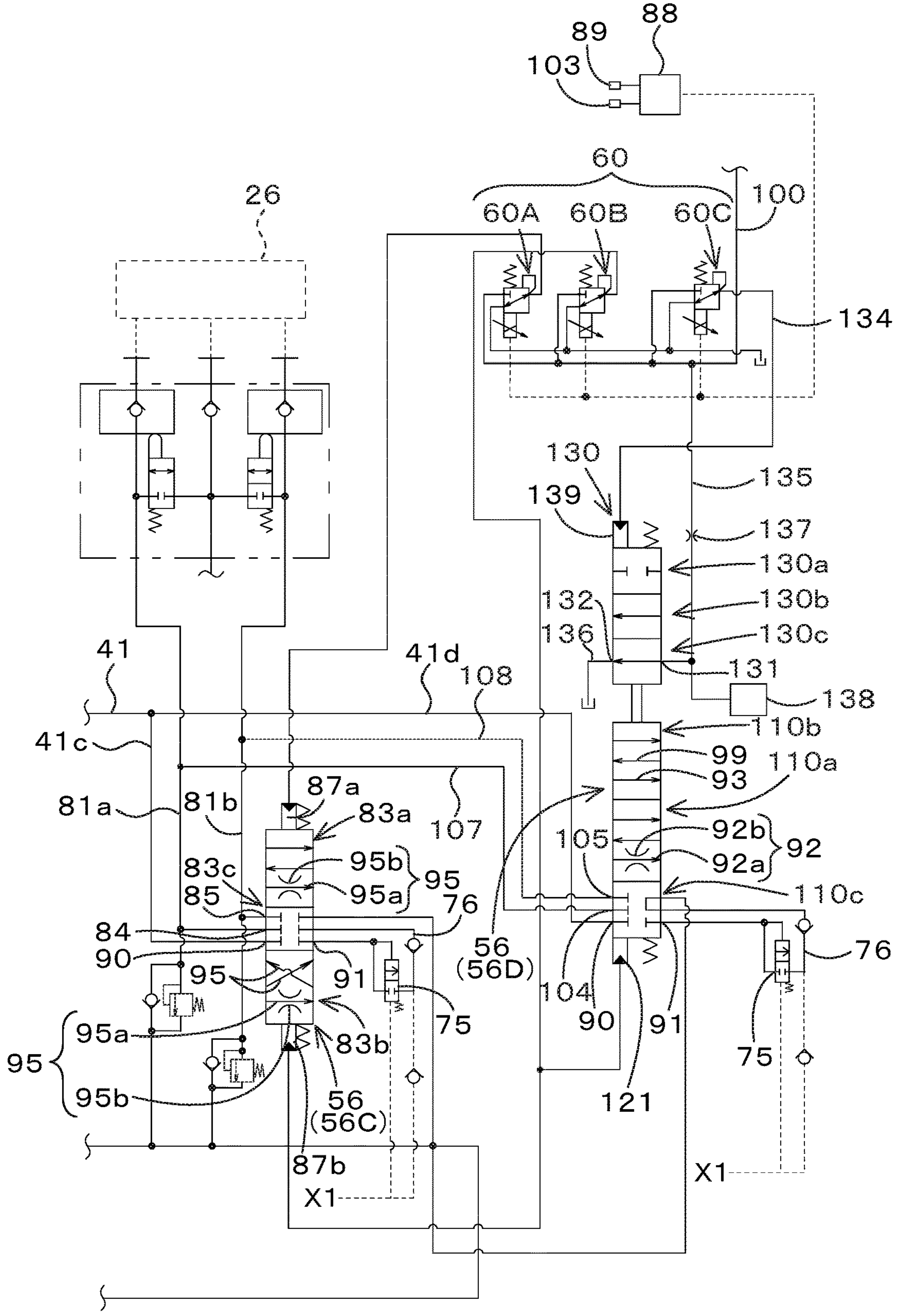
FIG. 6A is a schematic view of a hydraulic system for a working machine according to a third embodiment.

A hydraulic system for a working machine according to a third embodiment shown in FIG. 6A additionally employs detection means that detects the increase positions of the control valves 56C and 56D. In FIG. 6A, the boom control valve 56A and the working tool control valve 56B are not shown, but they are the same as those in the embodiments described above and shown in FIG. 1. In addition, the hydraulic system for the working machine according to the third embodiment has the similar configuration to the hydraulic system for the working machine according to the first embodiment described above. Only the configurations according to the third embodiment different from those according to the first embodiment will be described below.

The hydraulic system for the working machine according to the third embodiment is provided with an interlocking control valve 130. The interlocking control valve 130 is configured to be shifted in accordance with the shift of the second auxiliary control valve 56D among the plurality of shift positions. That is, the interlocking control valve 130 is shifted in conjunction with movement of the spool of the second auxiliary control valve 56D. The interlocking control valve 130 is a three-position switching valve shiftable among the blocking position 130*a* and a plurality of communicating positions 130*b* and 130*c*. When the second auxiliary control valve 56D is shifted to the neutral position 110*c*, the interlocking control valve 130 is shifted to the communicating position 130*c*. When the second auxiliary control valve 56D is shifted to the first position 110*a*, the interlocking control valve 130 is shifted to the communicating position 130*b*. When the second auxiliary control valve 56D is shifted to the second position 110*b*, the interlocking control valve 130 is shifted to the blocking position 130*a*.

That is, the interlocking control valve 130 can be shifted to the blocking position 130*a* by shifting the second auxiliary control valve 56D to the second position 110*b* serving as the increase position (out-of-land region) among the plurality of shift positions (110*a*, 110*b*, 110*c*), and can be shifted to the communicating position 130*b* or 130*c* by shifting the second auxiliary control valve 56D to a position other than the second position 110*b* serving as the increase position (out-of-land region).

The interlocking control valve 130 has a pressure receiving portion 139. The pressure receiving portion 139 of the interlocking control valve 130 is connected to the third proportional valve 60C, i.e., the actuation valve, via a fluid passage 134. By changing a pressure of hydraulic fluid (pilot fluid) output from the third proportional valve 60C (actuation valve), a position of the interlocking control valve 130 is shifted, and further a position of the second auxiliary control valve 56D is shifted.

The interlocking control valve 130 is connected to the detection fluid passage 135. Specifically, the interlocking control valve 130 has an input port 131 and an output port 132, the detection fluid passage 135 is connected to the input port 131, and the discharge fluid passage 136 is connected to the output port 132. The detection fluid passage 135 is connected to a fluid passage 100, and the throttle portion 137 is connected to the detection fluid passage 135. A pressure detection unit 138 is connected to the detection fluid passage 135. The pressure detection unit 138 includes a pressure sensor or a pressure switch such as to detect a pressure (pilot pressure) of hydraulic fluid (pilot fluid) flowing through the detection fluid passage 135.

The pressure detection unit 138 is operably connected to the controller 88. The controller 88 is configured to output a control signal to the third proportional valve (actuation valve) 60C and to change the control signal. For example, the controller 88 can change a value of the control signal, i.e., a current value, in a range from the minimum value of the control signal (corresponding to the neutral position) corresponding to the minimum of the operation amount of the operation member 89 (at its neutral position) to the maximum value of the control signal (corresponding to the maximum operation position) corresponding to the maximum of the operation amount (at the maximum operation position). That is, the controller 88 controls the third proportional valve (actuation valve) 60C to shift the spool of the second auxiliary control valve 56D from the neutral position 110*c* to the second position 110*b* serving as the increase position (out-of-land region) through the first position 110*a* serving as the decreased position (out-of-land region).

Figure 7A:
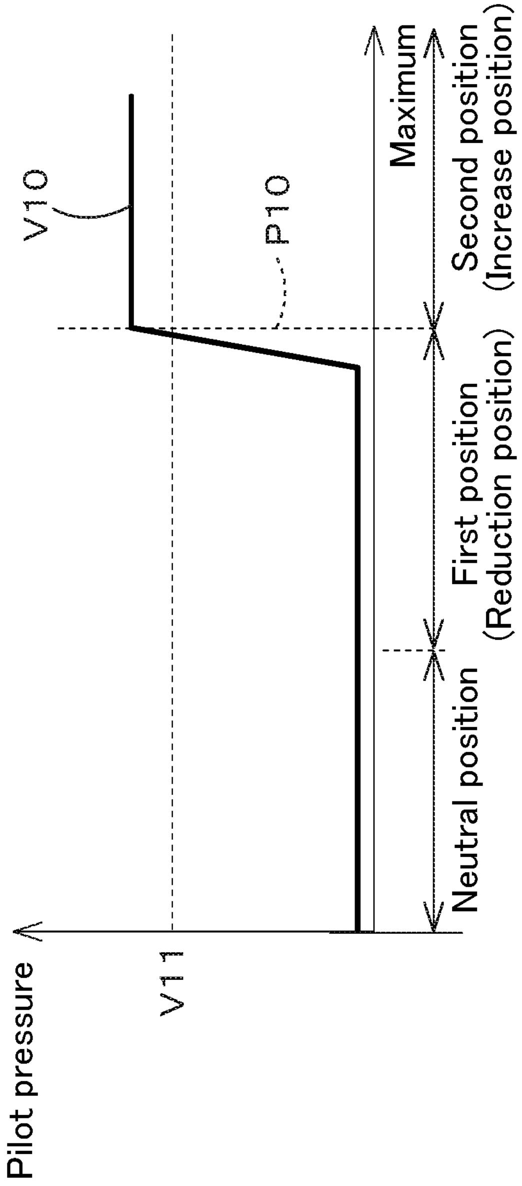
FIG. 7A is a view showing a change in a pilot pressure applied when a second auxiliary control valve 56D of FIG. 6A.

Here, when the second auxiliary control valve 56D is shifted to the neutral position 110*c* or the first position 110*a* serving as the reduction position (notch region), the interlocking valve 130 is shifted to the communicating position 130*b* or 130*c*, so that a pilot pressure V10 detected by the pressure detection unit 138 is substantially zero, as shown in FIG. 7A. When the second auxiliary control valve 56D is shifted from the first position 110*a* serving as the reduction position (notch region) to the second position 110*b* serving as the increase position (out-of-land region), the interlocking control valve 130 is shifted to the blocking position 130*a*, so that the pilot pressure V10 detected by the pressure detection unit 138 rises rapidly. That is, a point P10 at which the pilot pressure V10 (pilot pressure generated when the third proportional valve 60C (actuation valve) is actuated) detected by the pressure sensing unit 138 rapidly rises and reaches the maximum coincides to a point at which the second auxiliary control valve 56D shifted from the first position 110*a* serving as the reduction position (notch region) reaches the second position 110*b* serving as the increase position (out-of-land region). That is, in FIG. 7A, a pilot pressure at the point P10 is a threshold V11 such as to shift the second auxiliary control valve 56D to the second position 110*b* serving as the increase position (out-of-land region).

The controller 88 stores a value (current value) of the control signal such as to rapidly increase the pilot pressure V10 detected by the pressure detection unit 138 to the pressure at the point P10 and a current value of the third proportional valve (actuation valve) 60C corresponding to a value (current value) of the control signal to set the pilot pressure at the point P10. The controller 88 stores a relationship between a value (referred to as a valve-shifting current value) of the control signal and the shifting operation amount of the operation member 89 under a condition where the second auxiliary control valve 56D is shifted to the second position 110*b* serving as the increase position (out-of-land region). In summary, the controller 88 controls the third proportional valve (actuation valve) 60C after storing the current value (valve-shifting current value) of the third proportional valve (actuation valve) 60C, that is, the pilot pressure output by the third proportional valve (actuation valve) 60C, obtained when the pilot pressure V10 detected by the pressure detection unit 138 exceeds the threshold V11. In this manner, the second auxiliary control valve 56D is shifted to the increase position (out-of-land region).

In addition, when an operation amount of the operation member 89 is equal to or greater than a threshold (shifting operation amount), the controller 88 increases a pilot pressure to be output from the third proportional valve 60C (actuation valve) so that the pilot pressure V10 detected by the pressure detection unit 138 becomes equal to or greater than the threshold V11, thereby shifting the second auxiliary control valve 56D to the second position 110*b* serving as the increase position (out-of-land region). The controller 88 makes the value of the control signal, i.e., a current value, to be output to the third proportional valve 60C (actuation valve) equal to or higher than the valve-shifting current value.

In addition, when the second auxiliary control valve 56D is shifted to the second position 110*b* serving as the increase position (out-of-land area), and either the boom control valve 56A or the working tool control valve 56B is shifted to the reduction position (i.e., the first position 80*a* or 82*a* or the second position 80*b* or 82*b*), the controller 88 lowers the pilot pressure to be output from the third proportional valve 60C (actuation valve) so that the pilot pressure in the detection fluid passage 135 becomes less than the threshold V11. In this manner, the second auxiliary control valve 56D is shifted to the first position 110*a* serving as the reduction position (notch region). The controller 88 reduces a value of the control signal, i.e., a current value, output therefrom to the third proportional valve 60C (actuation valve) to be less than the valve-shifting current value.

Figure 6B:
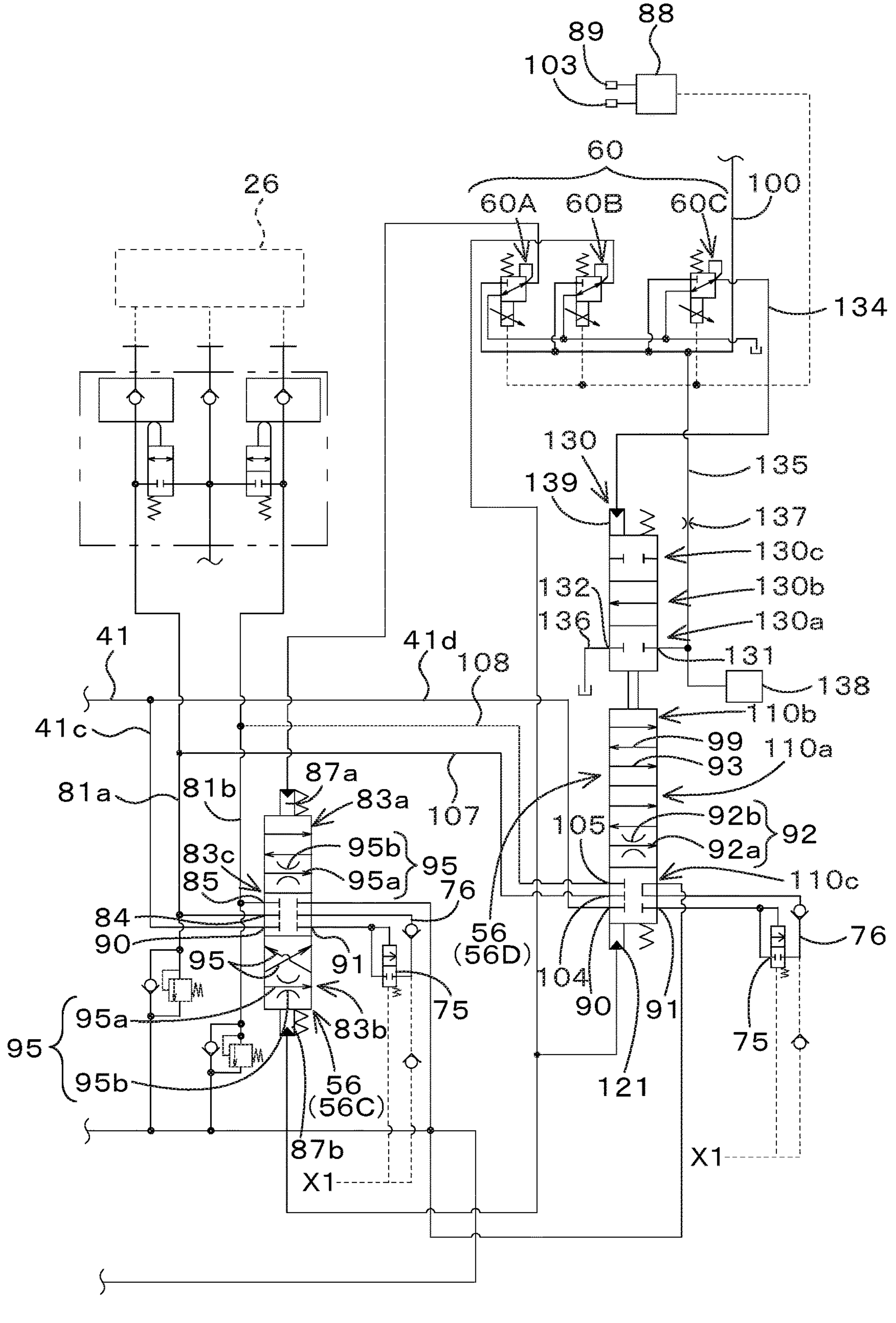
FIG. 6B is a view showing a modified example of the third embodiment.

As a modified example, the interlocking control valve 130 may be modified as shown in FIG. 6B. Specifically, the interlocking control valve 130 is configured to be shifted to the blocking position 130*a* by shifting the second auxiliary control valve 56D to the neutral position 110*c*. The interlocking valve 130 is configured to be shifted to the communicating position 130*b* by shifting the second auxiliary control valve 56D to the first position 110*a*, and the interlocking control valve 130 is shifted to the blocking position 130*c* by shifting the second auxiliary control valve 56D to the second position 110*b*.

Figure 7B:
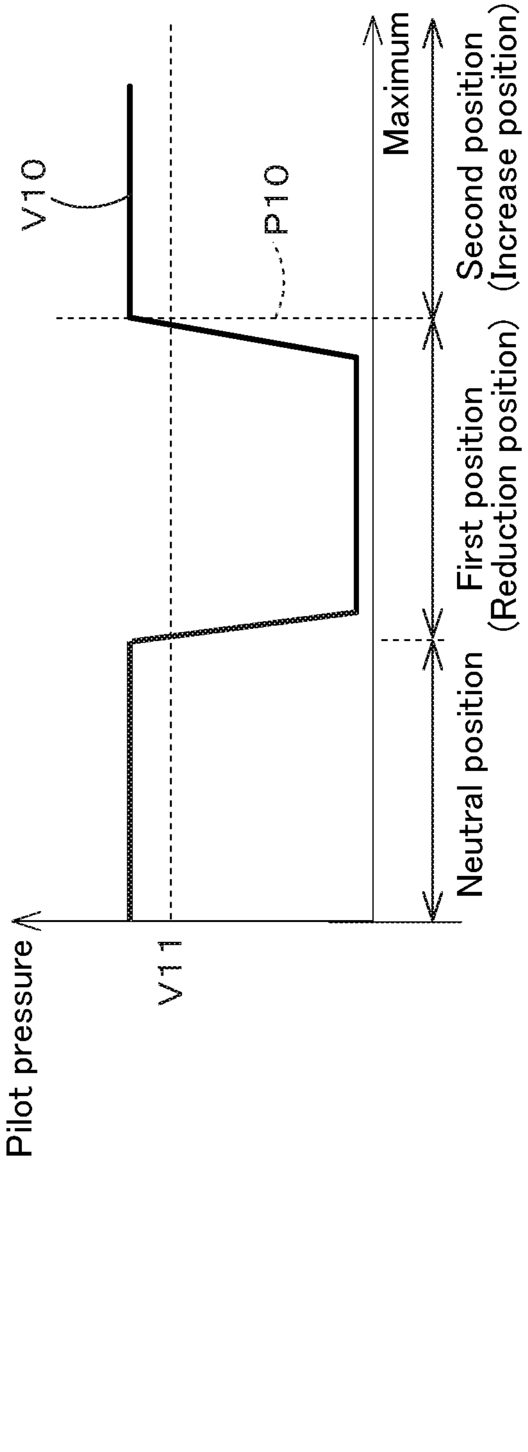
FIG. 7B is a view showing a change in a pilot pressure applied when the second auxiliary control valve 56D of FIG. 6B.

When the interlocking control valve 130 shown in FIG. 6B is employed, the pilot pressure V10 detected by the pressure detection unit 138 varies as shown in FIG. 7B, for example. In an example shown in FIG. 7B, as in the example shown in FIG. 7A, the point P10 at which the pilot pressure V10 (pilot pressure generated when the third proportional valve 60C (actuation valve) is actuated) rapidly increases and reaches the maximum coincides to a point at which the second auxiliary control valve 56D shifted from the first position 110*a* serving as the reduction position (notch region) reaches the second position 110*b* serving as the increase position (out-of-land region). When an operation amount of the operation member 89 is equal to or greater than a threshold (referred to as a valve-shifting operation amount), the controller 88 increases a pilot pressure output from the third proportional valve 60C (actuation valve) so that the pilot pressure V10 detected by the pressure detection unit 138 becomes equal to or greater than the threshold V11, thereby shifting the second auxiliary control valve 56D to the second position 110*b* serving as the increase position (out-of-land region).

Figure 6C:
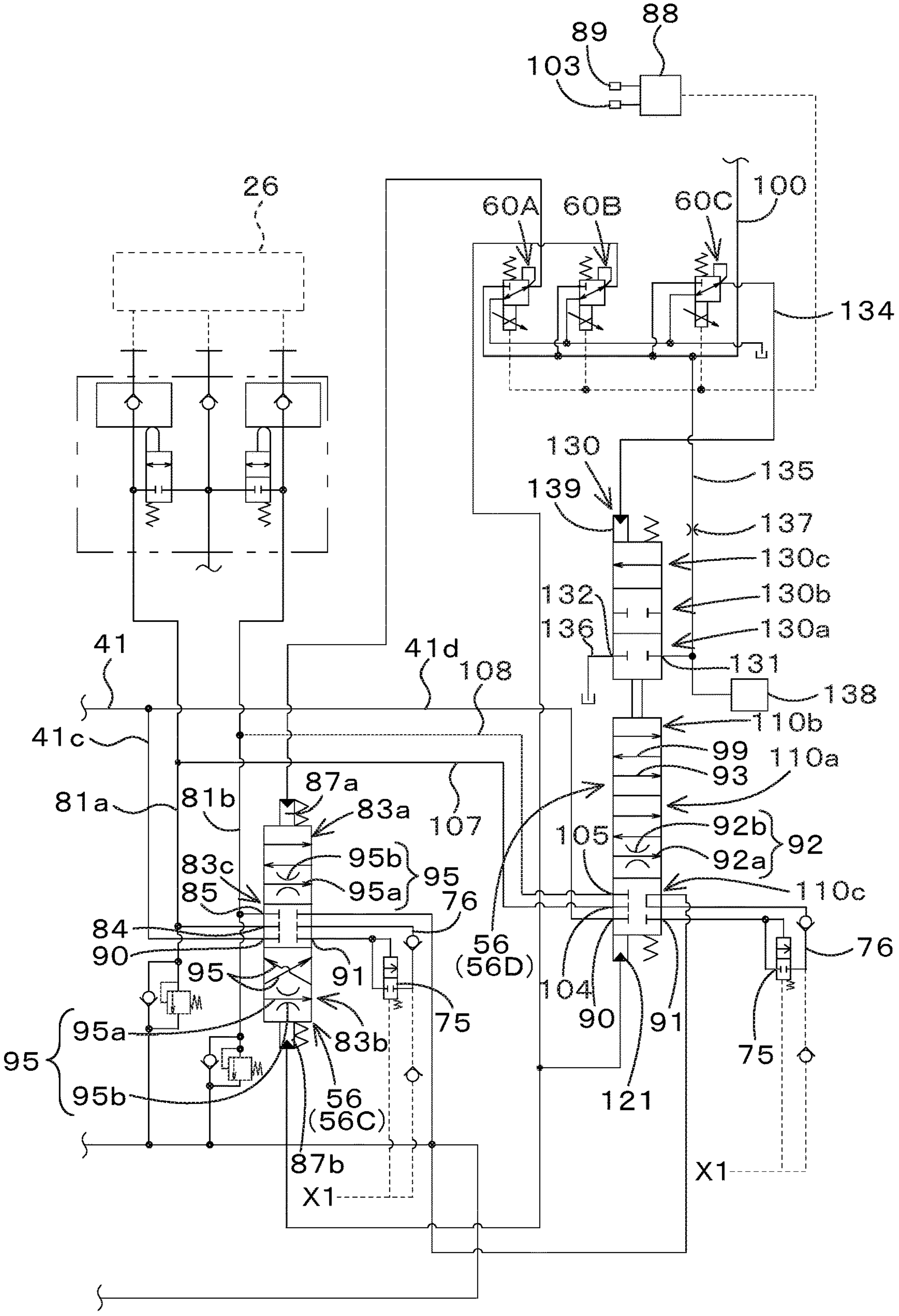
FIG. 6C is a view showing a modified example different from FIGS. 6A and 6B.

Alternatively, the interlocking control valve 130 may be modified as shown in FIG. 6C. Specifically, when the second auxiliary control valve 56D is shifted to the neutral position 110*c*, the interlocking control valve 130 is shifted to the blocking position 130*a*. When the second auxiliary control valve 56D is shifted to the second position 110*b*, the interlocking control valve 130 is shifted to the communicating position 130*c*. When the second auxiliary control valve 56D is shifted to the first position 110*a*, the interlocking control valve 130 is shifted to the blocking position 130*b*. That is, when the second auxiliary control valve 56D is shifted to the second position 110*b*, the pilot pressure detected by the pressure detection unit 138 is lowered, thereby informing that the second auxiliary control valve 56D has been shifted to the second position 110*b*.

Figure 7C:
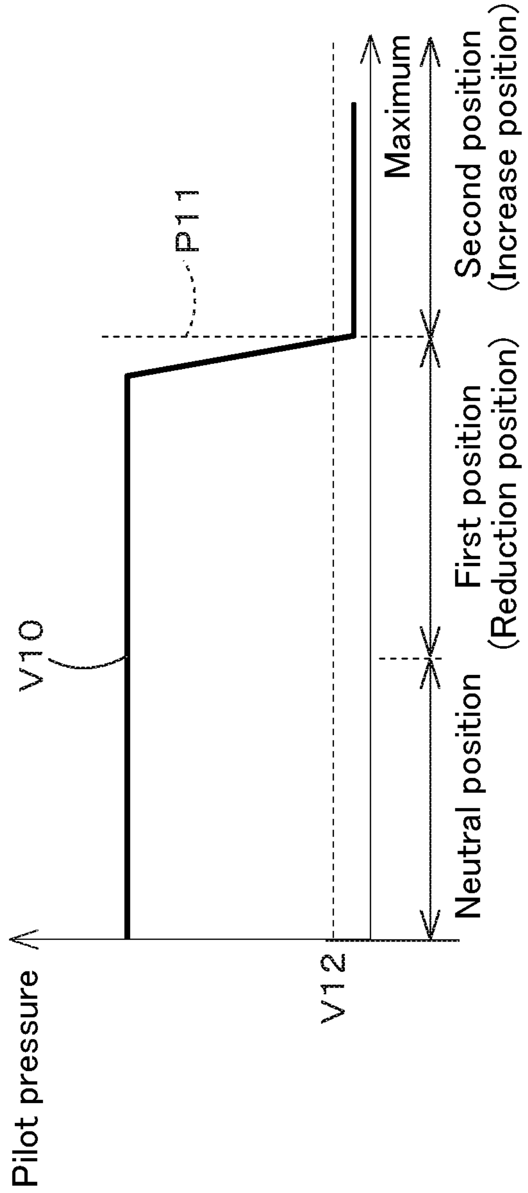
FIG. 7C is a view showing a change in a pilot pressure applied when the second auxiliary control valve 56D of FIG. 6C.

When the interlocking control valve 130 shown in FIG. 6C is employed, the pilot pressure V10 detected by the pressure detection unit 138 varies as shown in FIG. 7C. In the example shown in FIG. 7C, unlike the examples shown in FIGS. 7A and 7B, the point P11 at which the pilot pressure V10 (pilot pressure when the third proportional valve 60C (actuation valve) is actuated) drops rapidly and reaches the minimum coincides to a point at which the second auxiliary control valve 56D is shifted from the first position 110*a* serving as the reduction position (notch region) to the second position 110*b* serving as the increase position (out-of-land area). When an operation amount of the operation member 89 is equal to or greater than a threshold (referred to as a valve-shifting operation amount), the controller 88 lowers a pilot pressure output from the third proportional valve 60C (actuation valve) so that the pilot pressure V10 detected by the pressure detection unit 138 becomes less than the threshold V12 (e.g., the pilot pressure V10 becomes substantially zero), thereby causing the second reserve the control valve 56D to be shifted to the second position 110*b* serving as the increase position (out-of-land region).

In the example shown in FIG. 6C, the controller 88 stores a value (current value) of the control signal such as to rapidly decreasing the pilot pressure V10 detected by the pressure detection unit 138 to the pressure at the point P11 and a current value of the third proportional valve (actuation valve) 60C corresponding to a value (current value) of the control signal to set the pilot pressure at the point P11. The controller 88 stores a relationship between the shifting operation amount of the operation member 89 and a value (referred to as a valve-shifting current value) of the control signal to be output to the third proportional valve (actuation valve) 60C when the second auxiliary control valve 56D is shifted from the first position 110*a* serving as the reduction position (notch region) to the second position 110*b* serving as the increase position (out-of-land region). In summary, the controller 88 stores the current value (referred to as a valve-shifting current value) of the third proportional valve (actuation valve) 60C obtained when the pilot pressure V10 detected by the pressure detection unit 138 becomes less than the threshold V12, that is, the pilot pressure output by the third proportional valve (actuation valve) 60C, and then, the controller 88 controls the third proportional valve (actuation valve) 60C to shift the second auxiliary control valve 56D to the increase position (out-of-land area).

In addition, when the second auxiliary control valve 56D is shifted to the second position 110*b* serving as the increase position (out-of-land area) and either the boom control valve 56A or the working tool control valve 56B is shifted to the reduction position (i.e., the first position 80*a* or 82*a* or the second position 80*b* or 82*b*), the controller 88 increases a pilot pressure outputted from the third proportional valve 60C (actuation valve) so as to increase a pilot pressure of the detection fluid passage 135 to a value higher than the threshold V11, thereby shifting the second auxiliary control valve 56D to the first position 110*a* serving as the reduction position (notch area). The controller 88 increases a value of the control signal, i.e., a current value, output to the third proportional valve 60C (actuation valve) to a value higher than the valve-shifting current value.

The hydraulic system for the working machine according to the third embodiment described above, includes the detection fluid passage 135, the interlocking control valve 130 fluidly connected to the detection fluid passage 135 and configured to be shifted in correspondence to which of the shift positions the second auxiliary control valve 56D is shifted to, and the pressure detection unit 138 for detecting a pilot pressure in the detection fluid passage 135. The interlocking control valve 130 is shiftable to the blocking position 130*a* to block the pilot fluid introduced into the interlocking control valve 130 from the detection fluid passage 135 when the second auxiliary control valve 56D is shifted to the increase position of the shift positions.

According to this configuration, by shifting the interlocking control valve 130 to the blocking position 130*a* in accordance with the shift position (the reduction position or the increase position) of the second auxiliary control valve 56D. In this manner, it is possible to judge more accurately whether the second control valve 56D reaches the second position 110*b* serving as the increase position (out-of-land area) or not based on a pressure (pilot pressure) detected by the pressure detection unit 138.

In addition, the hydraulic system for the working machine, includes the operation member 89 for operating the auxiliary actuator, the controller 88 configured or programmed to output the control signal in correspondence to an operation amount of the operation member 89, and the actuation valve (proportional valve 60C) configured to change a pilot pressure output therefrom in correspondence to the control signal from the controller 88. The actuation valve (proportional valve 60C) is fluidly connected to either the pressure-receiving portion of the second auxiliary control valve 56D for receiving a pilot pressure or the pressure-receiving portion of the interlocking control valve 130 for receiving a pilot pressure. When the operation amount of the operation member 89 is not less than a threshold, the controller 88 is configured or programmed to shift the second auxiliary control valve 56D to the increase position by increasing the pilot pressure output from the actuation valve (proportional valve 60C) so as to increase the pilot pressure detected by the pressure detection unit 138 to a value not less than a threshold. According to this configuration, it possible to accurately shift the second auxiliary control valve 56D to the second position 110*b* serving as the increase position (out-of-land region) when an operation amount of the operation member 89 is equal to or greater than the threshold.

When the second auxiliary control valve 56D is shifted to the increase position and either the boom control valve 56A or the working tool control valve 56B is shifted to the reduction position, the controller 88 is configured or programmed to shift the second auxiliary control valve 56D to the reduction position by reducing the pilot pressure output from the actuation valve (proportional valve 60C) so as to reduce the pilot pressure in the detection fluid passage 135 to a value less than the threshold. According to this configuration, it possible to accurately shift the second auxiliary control valve 56D to the first position 110*a* serving as the reduction position (notch area) when an operation amount of the operation member 89 is less than a threshold.

The controller 88 is configured or programmed to change the control signal output therefrom to the actuation valve (proportional valve 60C), and to store, when the control signal is changed, a value of the changed control signal such as to change the pilot pressure detected by the pressure detection unit 138 to a value not less than the threshold. According to this configuration, a value of a control signal to be output by the controller 88 to set the second auxiliary control valve 56D to the first position 110*a* serving as the reduction position (notch region) can be accurately associated with a value of the control signal to be output by the controller 88 to set the second auxiliary control valve 56D to the second position 110*b* serving as the increase position (out-of-land area), and accordingly accuracy of a flowrate control of hydraulic fluid can be improved.

The interlocking control valve 130 is shiftable to an opening position to allow the pilot fluid introduced into the interlocking control valve 130 from the detection fluid passage 135 to pass through the interlocking control valve 130 when the second auxiliary control valve 56D is shifted to the increase position of the shift positions. According to this configuration, by shifting the interlocking control valve 130 to the communicating position 130*c*, it is possible to more accurately judge whether the interlocking control valve 130 reaches the second position 110*b* serving as the increase position (out-of-land area) based on a pressure (pilot pressure) detected by the pressure detection unit 138.

The controller 88 is configured or programmed to shift the second auxiliary control valve 56D to the increase position by reducing the pilot pressure output from the actuation valve (proportional valve 60C) so as to reduce the pilot pressure detected by the pressure detection unit 138 to a value less than a threshold V12. According to this configuration, the second auxiliary control valve 56D can be accurately shifted to the second position 110*b* serving as the increase position (out-of-land region) when an operation amount of the operation member 89 is greater than a threshold.

When the second auxiliary control valve 56D is shifted to the increase position and either the boom control valve 56A or the working tool control valve 56B is shifted to the reduction position, the controller 88 is configured or programmed to shift the second auxiliary control valve 56D to the reduction position by increase the pilot pressure output from the actuation valve (proportional valve 60C) so as to increase the pilot pressure in the detection fluid passage 135 to a value not less than the threshold V12. According to this configuration, the second auxiliary control valve 56D can be accurately shifted to the first position 110*a* serving as the reduction position (notch region) when the operation amount of the operation member 89 is less than a threshold.

The controller 88 is configured or programmed to change the control signal output therefrom to the actuation valve (proportional valve 60C), and to store, when the control signal is changed, a value of the changed control signal such as to change the pilot pressure detected by the pressure detection unit 138 to a value less than the threshold V12. According to this configuration, a value of a control signal to be output by the controller 88 to set the second auxiliary control valve 56D to the first position 110*a* serving as the reduction position (notch area) can be accurately associated with a value of the control signal to be output by the controller 88 to set the second auxiliary control valve 56D to the second position 110*b* serving as the increase position (out-of-land area), and accordingly accuracy of a flowrate control of hydraulic fluid can be improved.

Fourth Embodiment

Figure 8:
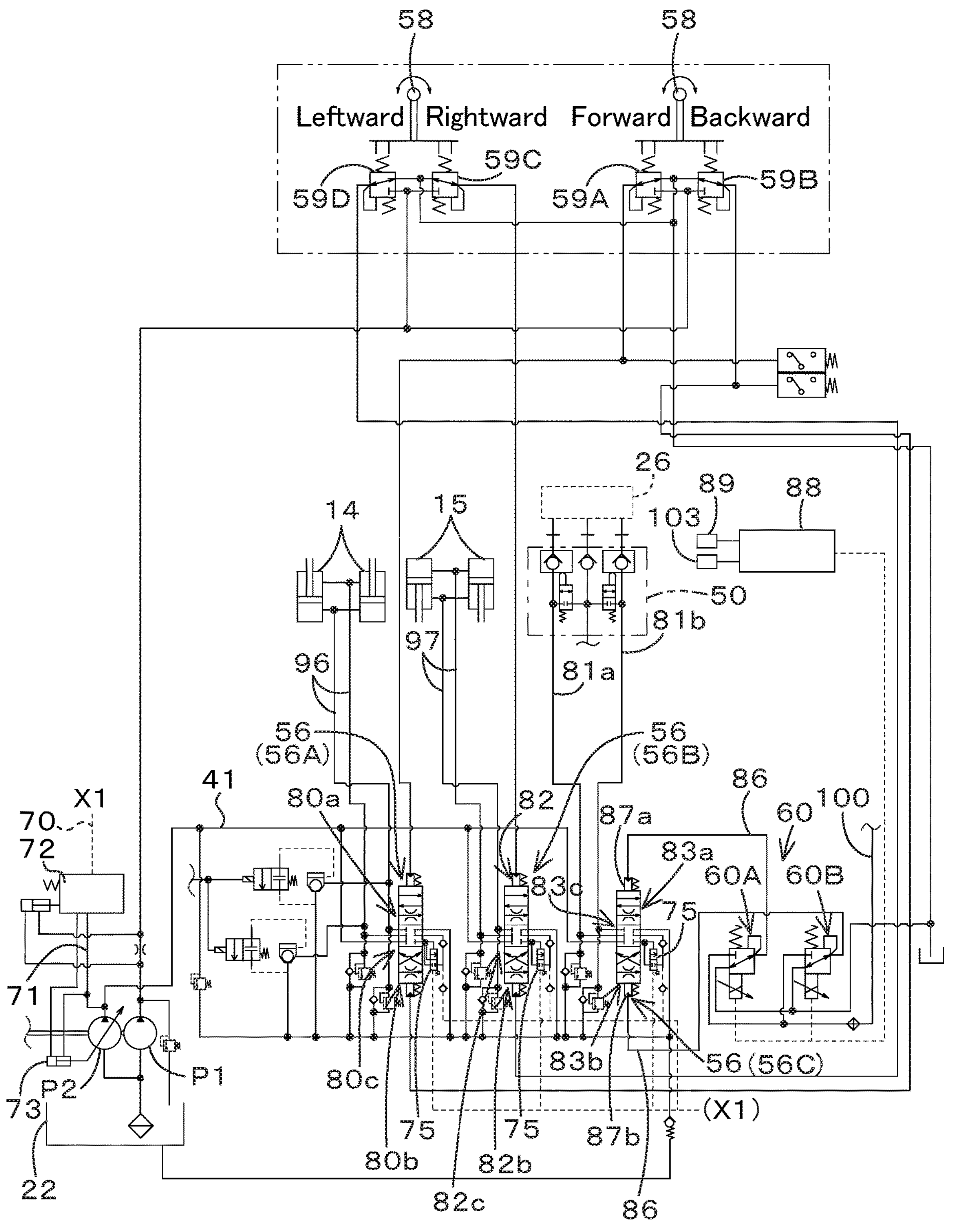
FIG. 8 is a schematic view of a hydraulic system for a working machine according to a fourth embodiment.

FIG. 8 shows a hydraulic system for a working machine according to a fourth embodiment. The hydraulic system for the working machine according to the fourth embodiment is a modification of the hydraulic system for the working machine according to the first embodiment. As shown in FIG. 8, the first auxiliary control valve 56C is not provided with the third position 83*d*. That is, the first auxiliary control valve 56C is not provided with the flowrate increase section 93. The other configurations of the control valves 56, including the boom control valve 56A and the working tool control valve 56B, are the same as those of the respective control valves 56 according to the first embodiment.

Figure 9:
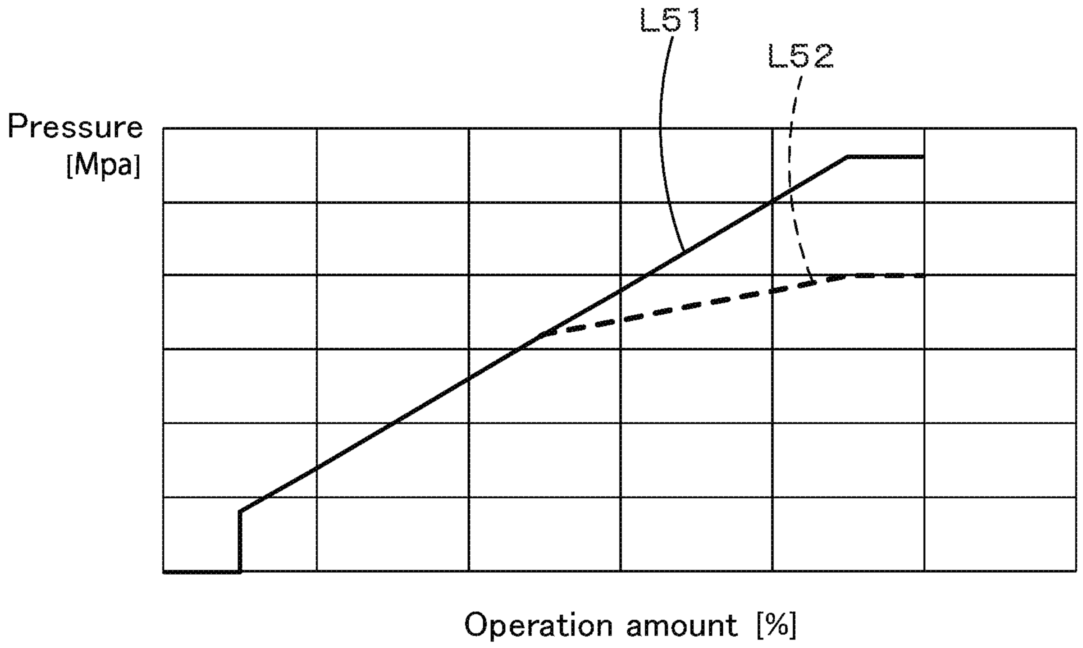
FIG. 9 is a view showing a relationship between the pilot pressure and an operation amount.

FIG. 9 shows an operation amount of the operation member 89 and a moving amount of the spool of the first auxiliary control valve 56C, that is, a pilot pressure acting on the pressure receiving portion 87*a* from the first proportional valve 60A. As shown in FIG. 9, in a state where only the operation member 89 (only the first auxiliary control valve 56C) is operated (single operation), the controller 88 raises a value of a control signal (current) or the like to be output to the first proportional valve 60A in accordance with increase of an operation amount of the operation member 89 as rising along a line L51, and gradually increases a pressure acting on the pressure receiving portion 87*a* of the first auxiliary control valve 56C.

On the other hand, in a state (combined operation) in which the operation member 89 (first auxiliary control valve 56C) and the operation lever 58 (either or both the boom control valve 56A or/and the working tool control valve 56B) are operated, the controller 88 increases the value of the control signal (current) or the like to be output to the first proportional valve 60A to an intermediate level according to increase of the operation amount of the operation member 89 as rising along a line L52 in FIG. 9. And, when an operation amount of the operation member 89 exceeds a predetermined level, the controller 88 lowers the value of the control signal (current) to be output to the first proportional valve 60A so that the current becomes lower than a value on the line L51.

That is, the controller 88 moves the spool of the first auxiliary control valve 56C from the minimum position to the maximum position gradually according to an operation of the operation member 89 when the first auxiliary control valve 56C is operated alone. On the other hand, when the first auxiliary control valve 56C is in the combined operation, the controller 88 gradually moves the spool of the first auxiliary control valve 56C from the minimum position to an intermediate position according to an operation of the operation member 89, and stops the second auxiliary control valve 56D in the intermediate position (closer to the neutral position than the maximum position) so that the operation lever 89 does not reach the maximum position.

Specifically, in a case where the boom control valve 56A and the first auxiliary control valve 56C are combinedly operated, the controller 88 can make a pilot pressure to be output from the first proportional valve 60A smaller than the maximum value, even when an operation amount of the operation member 89 is the maximum.

In the above description, the pilot pressure to be output from the first proportional valve 60A is made smaller. Alternatively, a pilot pressure output from the second proportional valve 60B may be made smaller than the maximum value based on a position of the second auxiliary control valve 56D. That is, in the description of the fourth embodiment described above, the first proportional valve 60A may be replaced by the second proportional valve 60B.

Figure 10A:
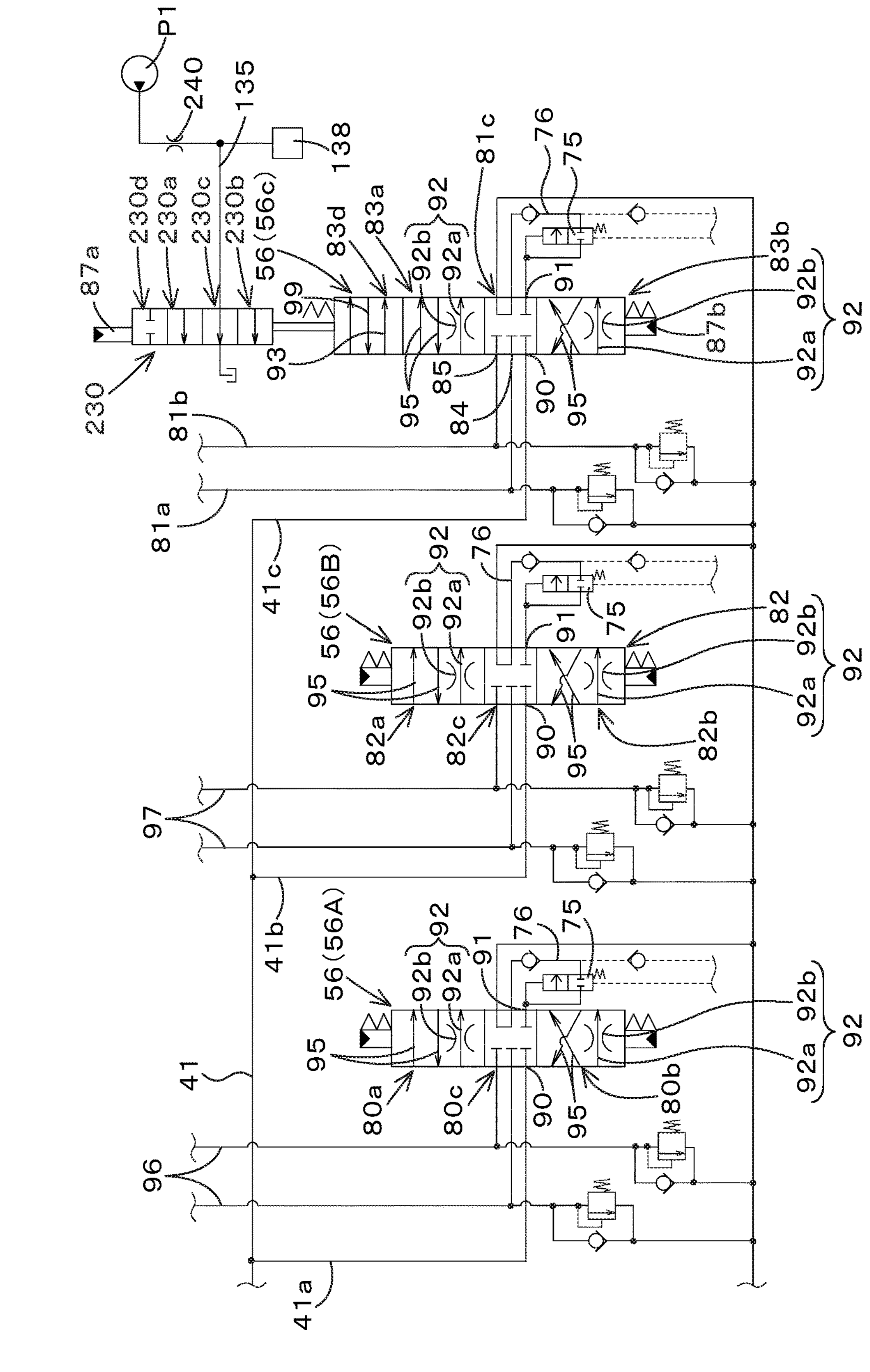
FIG. 10A is a view showing a modified example of the hydraulic system for the working machine according to the fourth embodiment.

As another modification, the interlocking valve 230 may be applied to the first auxiliary control valve 56C as shown in FIG. 10A. As shown in FIG. 10A, an interlocking valve 230 is connected to the detection fluid passage 135. A pressure detection unit 138 that detects a pressure (pilot pressure) of the hydraulic fluid (pilot fluid) flowing in the detection fluid passage 135 is connected to the detection fluid passage 135. The pressure detection unit 138 is a pressure sensor or a pressure switch. The fluid passage leading to the detection fluid passage 135 and the second hydraulic pump P2 is provided with a throttle portion 240.

When the first auxiliary control valve 56C is shifted to the neutral position 81*c*, the interlocking valve 230 is shifted to the communicating position 230*c*. When the first auxiliary control valve 56C is shifted to the first position 83*a*, the interlocking valve 230 is shifted to the communicating position 230*a*. When the first auxiliary control valve 56C is shifted to the second position 83*b*, the interlocking valve 230 is shifted to the communicating position 230*b*. When the first auxiliary control valve 56C is shifted to the third position 83*d*, the interlocking valve 230 is shifted to the blocking position 230*d*. That is, when the first auxiliary control valve 56C is shifted to the third position 83*d*, a pilot pressure of the pressure detection unit 138 is increased, thereby informing that the first auxiliary control valve 56C has been shifted to the third position 83*d*.

Figure 10B:
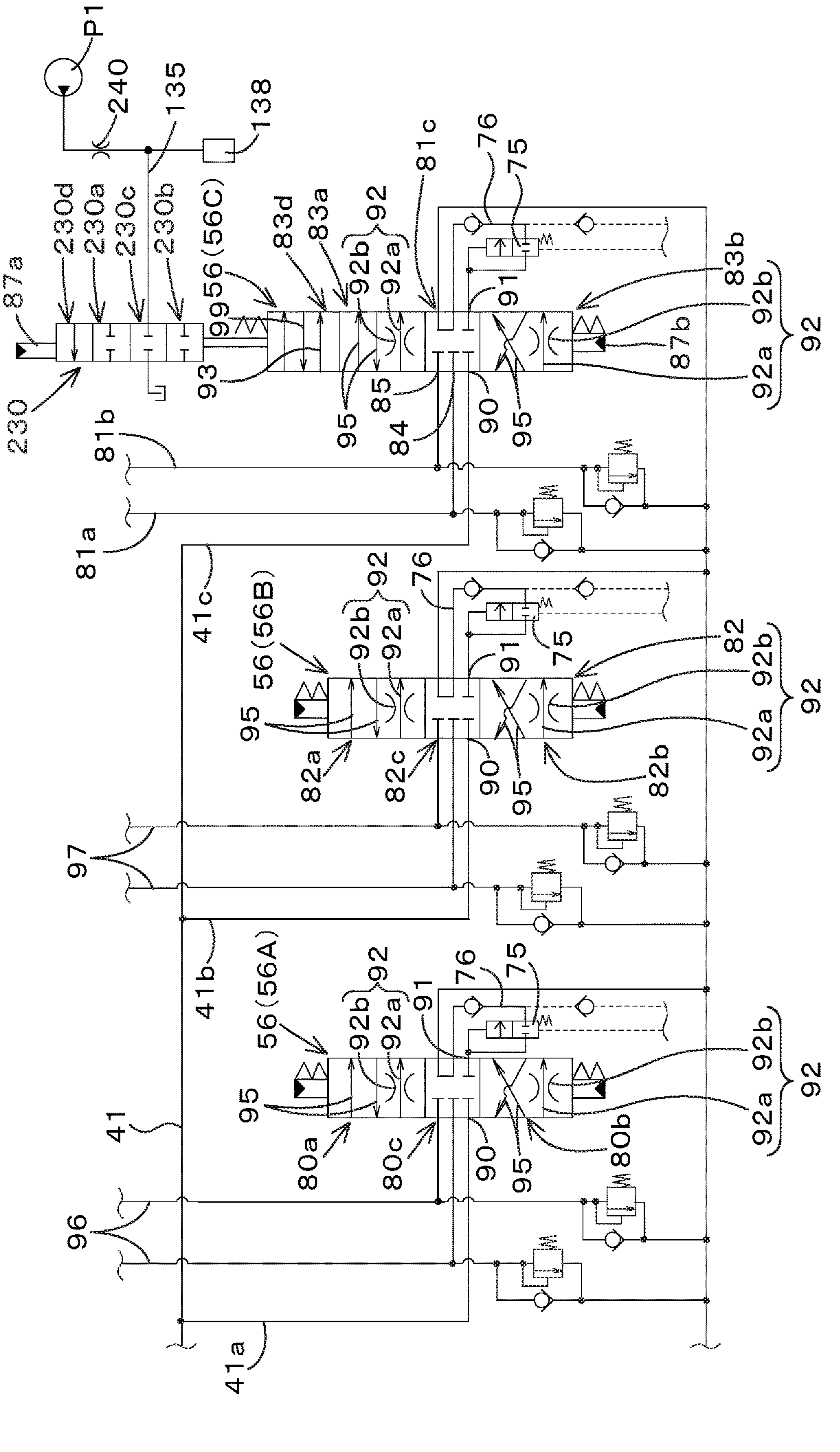
FIG. 10B is a view showing a modified example different from FIG. 10A.

In addition, the interlocking valve 230 may be modified as shown in FIG. 10B. When the first auxiliary control valve 56C is shifted to the neutral position 81*c*, the interlocking valve 230 is shifted to the blocking position 230*c*. When the first auxiliary control valve 56C is shifted to the first position 83*a*, the interlocking valve 230 is shifted to the blocking position 230*a*. When the first auxiliary control valve 56C is shifted the second position 83*b*, the interlocking valve 230 is shifted to the blocking position 230*b*. When the first auxiliary control valve 56C is shifted to the third position 83*d*, the interlocking valve 230 is shifted to the communicating position 230*d*. That is, when the first auxiliary control valve 56C is shifted to the third position 83*d*, a pilot pressure of the pressure detection unit 138 is decreased, thereby informing that the first auxiliary control valve 56C has been shifted to the third position 83*d*.

Figure 11A:
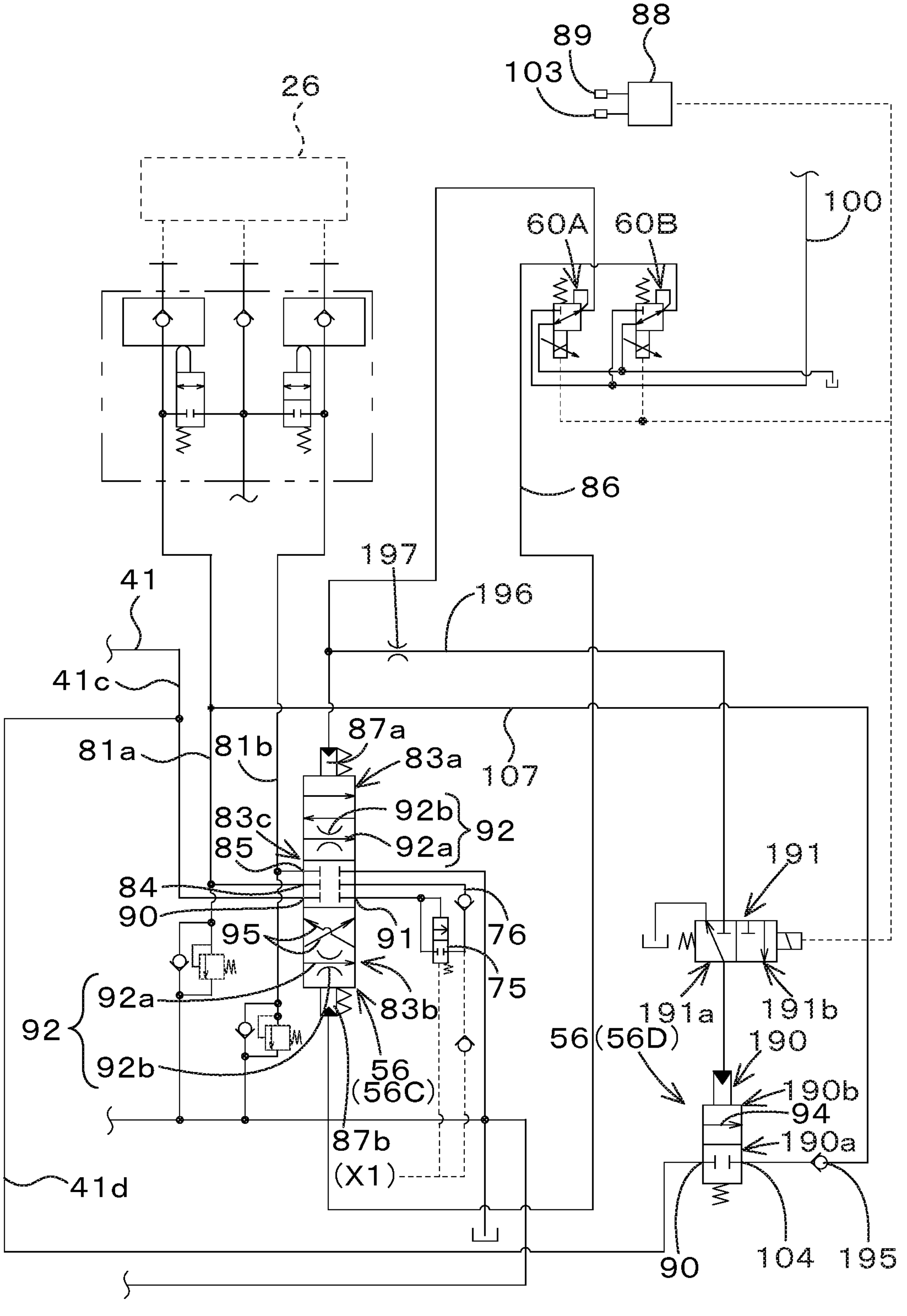
FIG. 11A is a view showing a modified example of FIG. 4A.

In addition, the second auxiliary control valve 56D may be modified as shown in FIG. 11A. The second auxiliary control valve 56D shown in FIG. 11A includes a main control valve 190 and a switching valve 191. The main control valve 190 is a two-position switching valve shiftable between a first position 190*a* and a second position 190*b*. The main control valve 190 is provided with the flowrate increase section 94 that functions when the main control valve 190 is at a position corresponding to the first position 190*b*. The input port 90 of the main control valve 190 is connected to the fluid passage 41*d*, and the third supply and discharge port 104 is connected to the fluid passage 107. The fluid passage 107 includes a check valve 195 to allow hydraulic fluid to flow from the main control valve 190 toward the first supply and discharge fluid passage 81*a* and to prevent the hydraulic fluid from flowing from the first supply and discharge fluid passage 81*a* to the main control valve 190. The switching valve 191 is configured to shift the main control valve 190. The input port side of the switching valve 191 is connected to the pilot fluid passage 86 via the fluid passage 196, and the output port side of the switching valve 191 is connected to the pressure receiving portion of the main control valve 190. The fluid passage 196 includes a throttle portion 197.

The switching valve 191 is shiftable between the first position 191*a* and the second position 191*b* according to a control signal from the controller 88. When the switching valve 191 is shifted to the second position 191*b*, a pilot pressure of the hydraulic fluid (pilot fluid) in the pilot fluid passage 86 is applied to the main control valve 190, and the main control valve 190 is shifted to the second position 190*b*. In this manner, the hydraulic fluid in the fluid passage 41*d* can be supplied to the fluid passage 107 through the main control valve 190 (flowrate increase section 94).

Figure 11B:
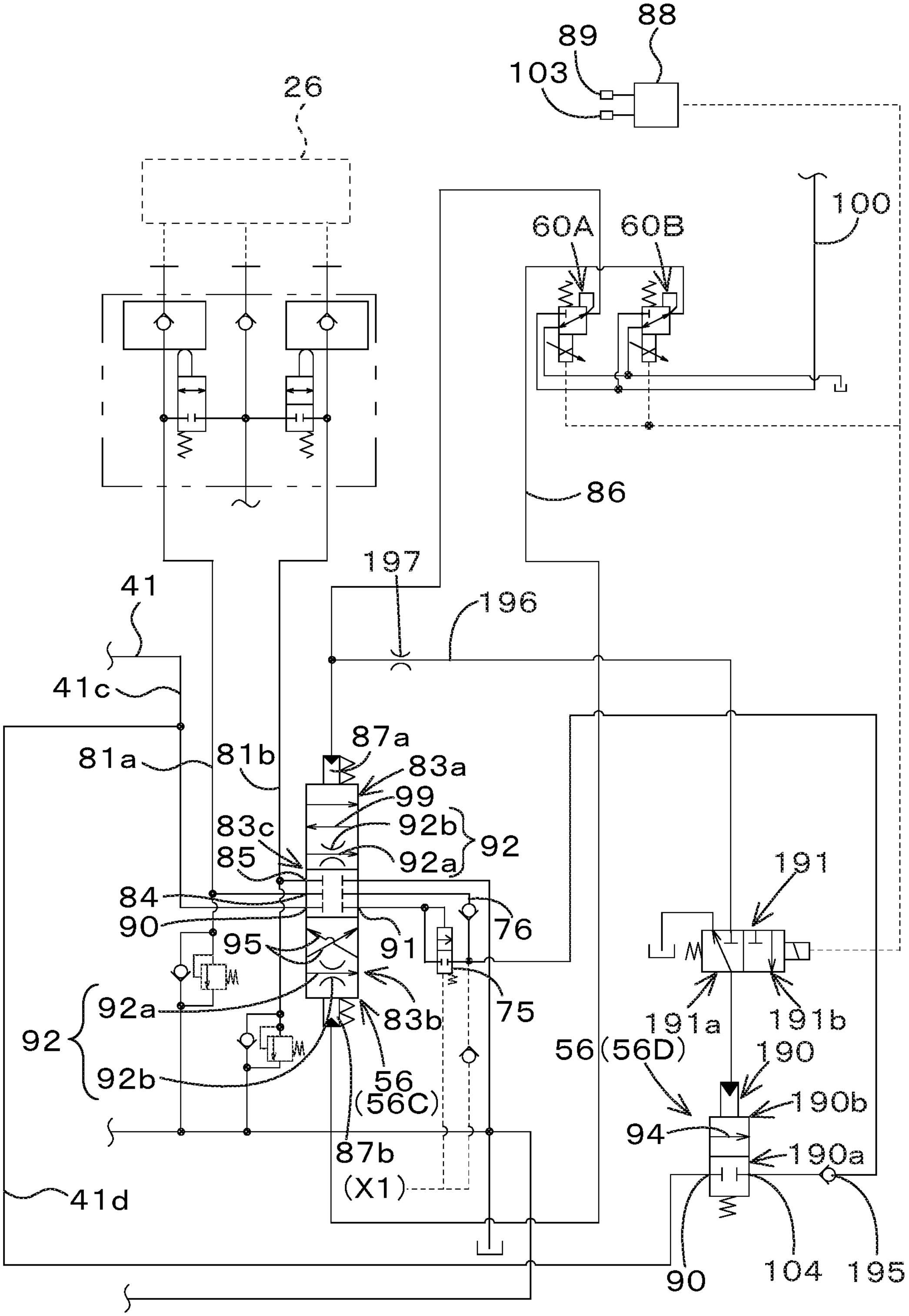
FIG. 11B is a view showing a modified example of FIG. 11A.

As shown in FIG. 11B, when the flowrate reduction section 92 and the internal fluid passage 99 are provided to the first auxiliary control valve 56C, an output port 144 side of the main control valve 190 may be connected to the fluid passage 76. In addition, in FIG. 11A, the second auxiliary control valve 56D is constituted of a main control valve 190 and a switching valve 191, and the main control valve 190 is shifted by pilot fluid. Alternatively, as shown in FIG. 11C, the main control valve 190 may be replaced by a direct-acting switching valve that is shifted directly by an operation member such as a lever.

Figure 11C:
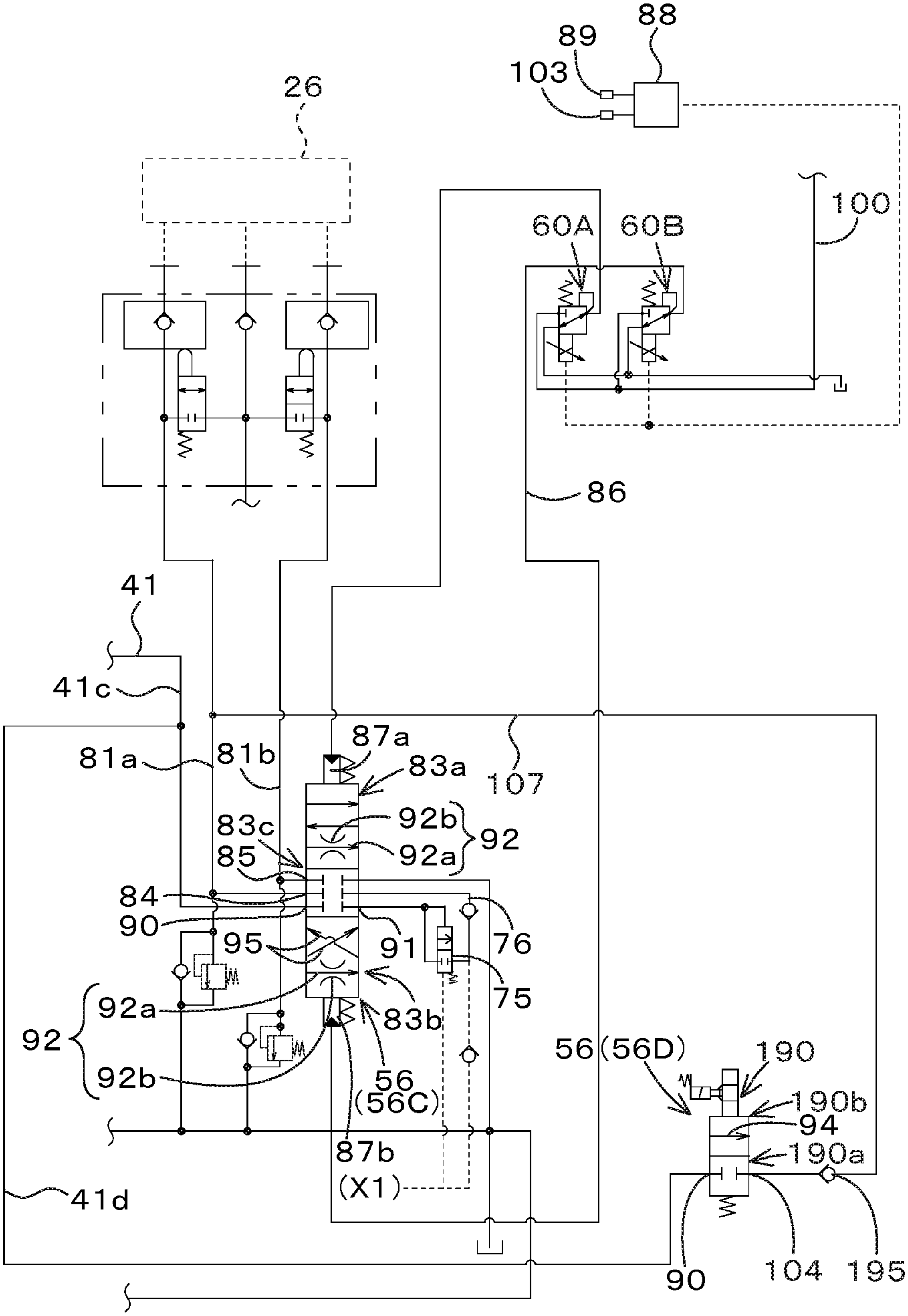
FIG. 11C is a view showing a modified example of FIG. 11B.

In addition, in FIGS. 11A to 11C, when the boom control valve 56A (boom 10) and the working tool control valve 56B (a working tool) are activated, the flowrate increase section 94 of the main control valve 190 is closed. That is, even when an operation member such as a switch is operated to give an instruction to increase hydraulic fluid, the controller 88 shifts the switching valve 191 to the first position 191*a* when at least one of the boom control valve 56A and the working tool control valve 56B (the working tool) is to be activated, thereby shifting the main control valve 190 from the second position 190*b* to the first position 190*a*. Additionally, when at least either the boom control valve 56A or the working tool control valve 56B (the working tool) is activated, the first auxiliary control valve 56C is held at the first position 83*a* so as to supply hydraulic fluid to the auxiliary attachment 26 via the flow reduction section 92.

In addition, in FIGS. 11A to 11C, the fluid passage 196 is connected to the pilot fluid passage 86. However, the fluid passage 196 may be connected to the fluid passage 100.

In the embodiments described above, any method may be adopted to detect the operations of the boom control valve 56A (the boom 10) and the working tool control valve 56B (the working tool). For example, the controller 88 may include a state detector 103. The state detector 103 is configured to detect the operation and movement of at least either one of the boom 10 and the working tool such as the bucket 11. For example, the state detector 103 may include an angle sensor for detecting angles of the boom 10 and bucket 11, a pressure sensor for detecting pressures of the pilot valves 59A to 59D, a telescopic detection sensor for detecting the extension and contraction of the boom cylinder 14 or working tool cylinder 15, or a sensor for detecting an operational direction of the operation lever 58. The state detector 103 is capable of detecting that the boom control valve 56A (boom 10) and the working tool control valve 56B (operation tool) have been operated.

Fifth Embodiment

Figure 12A:
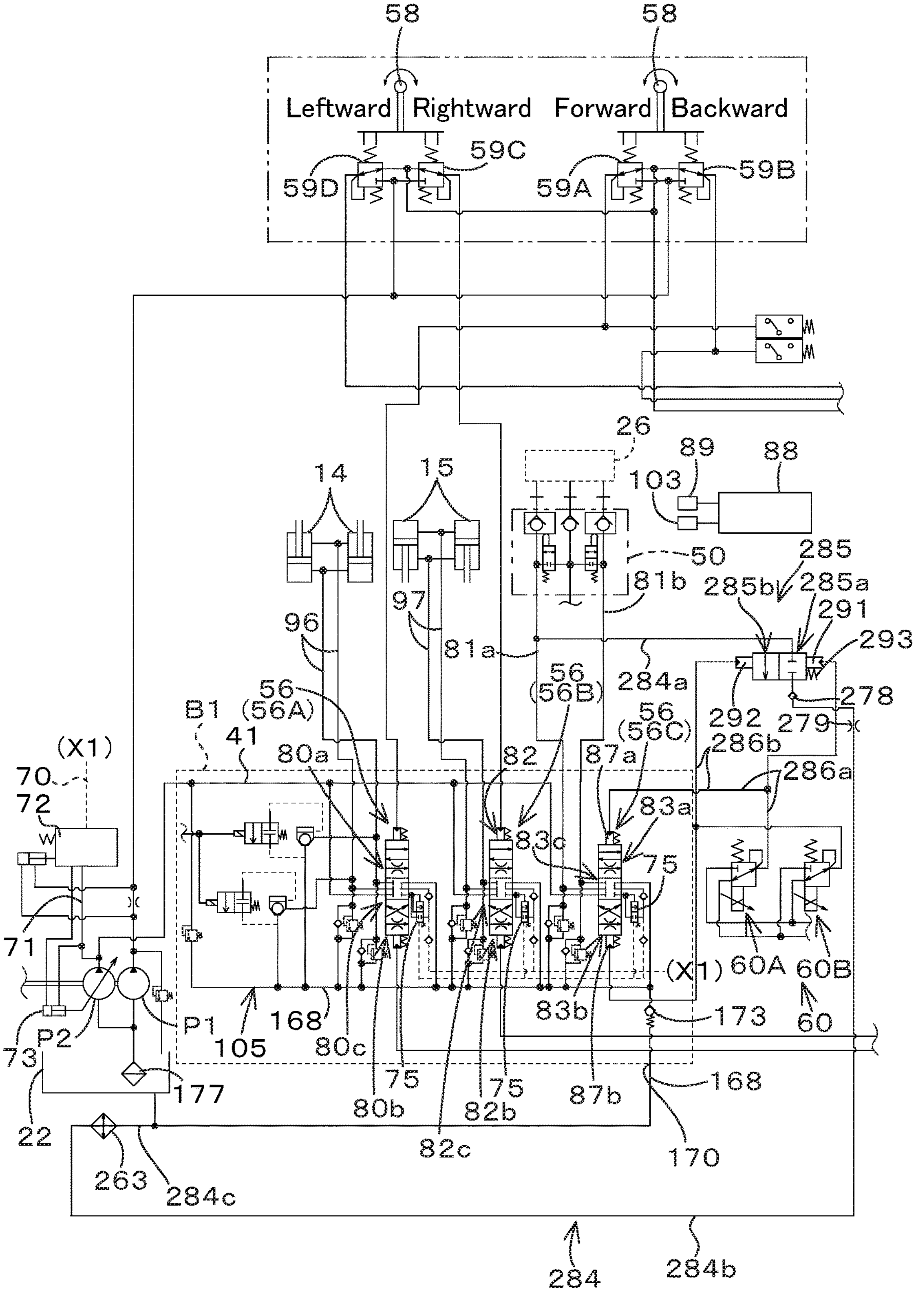
FIG. 12A is a schematic view of a hydraulic system for a working machine according to a fifth embodiment.

FIG. 12A shows a hydraulic system for a working machine according to a fifth embodiment. Referring to FIG. 12A, the hydraulic system for the working machine is provided with a drain fluid passage 284 and a switching valve 285. The drain fluid passage 284 includes a first drain fluid passage 284*a* connecting the first supply and discharge fluid passage 81*a* to the switching valve 285, a second drain fluid passage 284*b* connecting the switching valve 285 to the oil cooler 263, and a third drain fluid passage 284*c* connecting the oil cooler 263 to the hydraulic fluid tank 22.

The switching valve 285 is a valve configured to change an opening degree thereof, and is a two-position switching valve shiftable between a first position 285*a* and a second position 285*b*. When the switching valve 285 is in the first position 285*a*, the opening degree is substantially zero, and the fluidal connection between the first drain fluid passage 284*a* and the second drain fluid passage 284*b* is interrupted. When the switching valve 285 is in the second position 285*b*, the opening degree is full, and the first drain fluid passage 284*a* is connected to the second drain fluid passage 284*b*.

The operation of the switching valve 285 between the first position 285*a* and the second position 285*b* is performed by a pilot pressure. The switching valve 285 includes a pressure receiving portion 291 and a pressure receiving portion 292 each of which receives the pilot pressure. The pressure receiving portion 291 of the switching valve 285 is connected to a pilot fluid passage 286*a* that is connected to the first proportional valve 60A and a pressure receiving portion 87*a* of the first auxiliary control valve 56C. The pressure receiving portion 292 of the switching valve 285 is connected to a pilot fluid passage 286*b* that is connected to the second proportional valve 60B and a pressure receiving portion 87*b* of the first auxiliary control valve 56C.

In the drain fluid passage 284, a check valve 278 is interposed between the switching valve 285 and the hydraulic fluid tank 22. The check valve 278 is configured to block hydraulic fluid flowing from the oil cooler 263 toward the switching valve 285.

In addition, the drain fluid passage 284 includes a throttle portion 279. Specifically, the throttle portion 279 is provided at a portion of the second drain fluid passage 284*b* of the drain fluid passage 284 closer to the oil cooler 263 than the check valve 278. Due to the throttle portion 279, a pressure of the hydraulic fluid (drained fluid) flowing to the oil cooler 263 can be restricted.

According to the above configuration, when the opening degree of the second proportional valve 60B is increased to a predetermined opening degree (threshold) or more, a pilot pressure applied to the pressure receiving portion 292 of the switching valve 285 can be increased. The switching valve 285 includes a spool that is biased toward the first position 285*a* by a biasing member 293 such as a spring. When a pilot pressure applied to the pressure receiving portion 292 of the switching valve 285 is made equal to or higher than a predetermined value for moving the spool, the spool moves against the biasing member 293 to shift the switching valve 285 to the second position 285*b*, thereby discharging hydraulic fluid from the first supply and discharge fluid passage 81*a* to the drain fluid passages 284 (first drain fluid passage 284*a*, second drain fluid passage 284*b*, and third drain fluid passage 284*c*) through the switching valve 285.

On the other hand, when an opening degree of the first proportional valve 60A is increased to a predetermined opening degree (threshold) or greater, a pilot pressure can be applied to the pressure receiving portion 291 of the switching valve 285, and the switching valve 285 can be shifted to the first position (initial position) 285*a*. That is, by opening the first proportional valve 60A, the switching valve 285 can be forced back to the initial position.

Figure 12B:
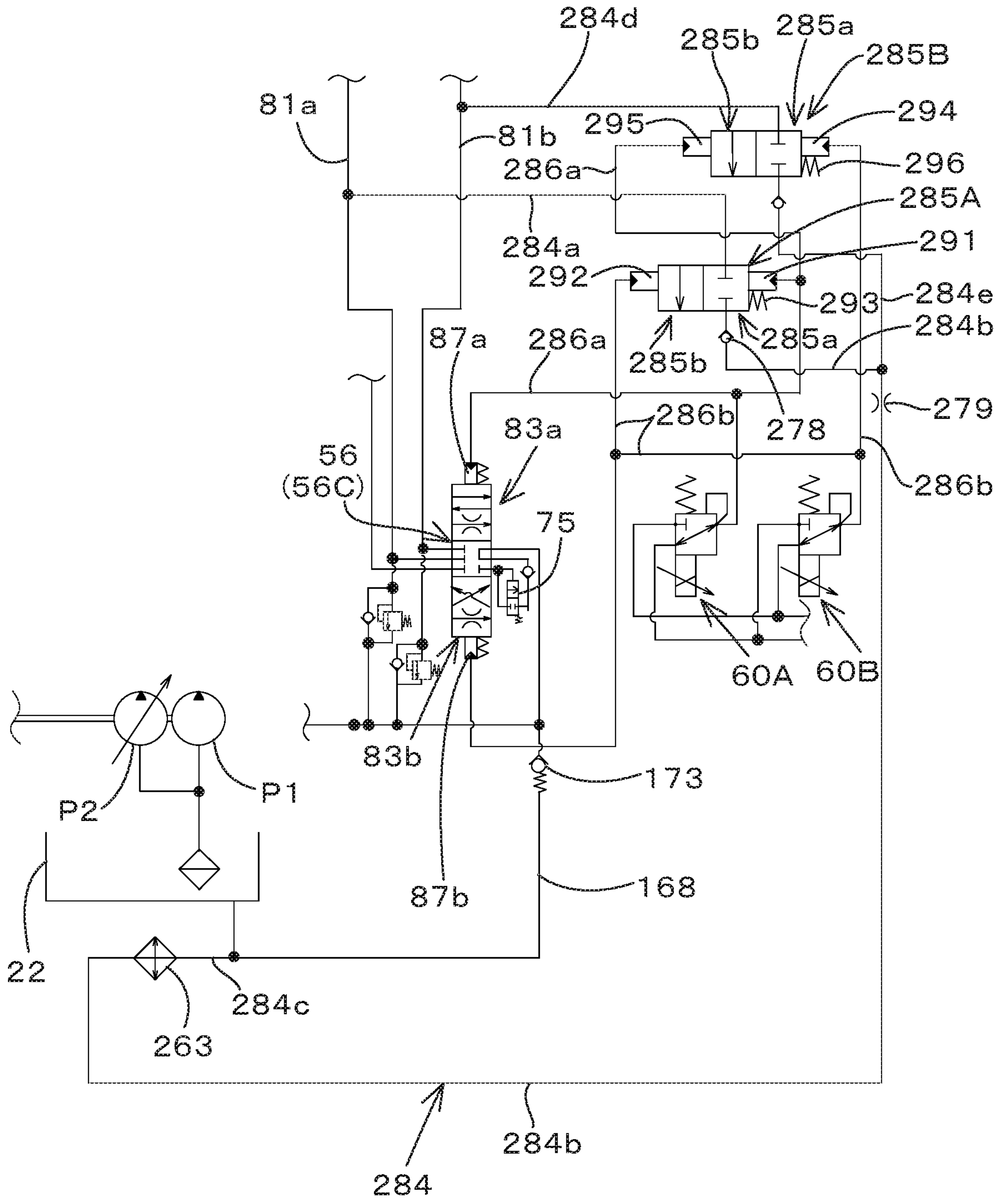
FIG. 12B is a view showing a modified example of the hydraulic system for the working machine according to the fifth embodiment.

FIG. 12B shows a modification of the hydraulic system for the working machine according to the second embodiment. The hydraulic system for the working machine shown in FIG. 12B includes a switching valve (first switching valve) 285A and a switching valve (second switching valve) 285B.

The first switching valve 285A has the same configuration as the switching valve 285 shown in FIG. 12A. The second switching valve 285B, like the first switching valve 285A, is a two-position switching valve configured to be shifted between the first position 285*a* and the second position 285*b*. The second switching valve 285B includes a pressure receiving portion 294 and a pressure receiving portion 295 each of which receives the pilot pressure. The pressure receiving portion 294 of the switching valve 285B is connected to a pilot fluid passage 286*b* that is connected to the second proportional valve 60B and the pressure receiving portion 87*b* of the first auxiliary control valve 56C. The pilot fluid passage 286*b* is also connected to the pressure receiving portion 292 of the first switching valve 285A.

The pressure receiving portion 295 of the second switching valve 285B is connected to the pilot fluid passage 286*a* that is connected to the first proportional valve 60A and the pressure receiving portion 87*a* of the first auxiliary control valve 56C. The pilot fluid passage 286*a* is also connected to the pressure receiving portion 291 of the first switching valve 285A.

The drain fluid passage 284 shown in FIG. 12B includes a fourth drain fluid passage 284*d* and a fifth drain fluid passage 284*e* in addition to the first drain fluid passage 284*a*, the second drain fluid passage 284*b*, and the third drain fluid passage 284*c*. The fourth drain fluid passage 284*d* connects the second supply and discharge fluid passage 81*b* to the second switching valve 285B. The fifth drain fluid passage 284*e* connects the second switching valve 285B to the second drain fluid passage 284*b*, and is merged with the second drain fluid passage 284*b*.

According to the fifth embodiment mentioned above, when an opening degree of the second proportional valve 60B is increased to a predetermined opening degree (threshold) or more, a pilot pressure applied on the pressure receiving portion 292 of the first switching valve 285A and the pressure receiving portion 294 of the second switching valve 285B can be increased.

The switching valve 285A includes a spool that is biased toward the first position 285*a* by a biasing member 293. When a pilot pressure applied to the pressure receiving portion 292 of the first switching valve 285A is increased to be equal to or higher than a predetermined value for moving the spool, the spool is moved against the biasing member 293 to shift the switching valve 285A to the second position 285*b* thereby discharge the hydraulic fluid from the first supply and discharge fluid passage 81*a* to the drain fluid passage 284. In addition, when an opening degree of the second proportional valve 60B is made equal to or greater than a predetermined opening degree (threshold), a pilot pressure acts on the pressure receiving portion 294 of the second switching valve 285B, thereby forcing the second switching valve 285B back to the first position 285*a* (initial position).

On the other hand, when an opening degree of the first proportional valve 60A is made equal to or greater than a predetermined opening degree (threshold), a pilot pressure applied to the pressure receiving portion 291 of the first switching valve 285A and the pressure receiving portion 295 of the second switching valve 285B can be increased.

The switching valve 285B includes a spool that is biased toward the first position 285*a* by a biasing member 296. When a pilot pressure applied to the pressure receiving portion 295 of the second switching valve 285B is made equal to or higher than a predetermined value for moving the spool, the spool of the second switching valve 285B is moved against the biasing member 293 to shift the switching valve 285B, thereby discharging hydraulic fluid from the second supply and discharge fluid passage 81*b* to the drain fluid passage 284. In addition, when an opening degree of the first proportional valve 60A is made equal to or greater than a predetermined opening degree (threshold), a pilot pressure acts on the pressure receiving portion 291 of the first switching valve 285A, thereby forcing the first switching valve 285A back to the first position 285*a* (initial position).

Figure 12C:
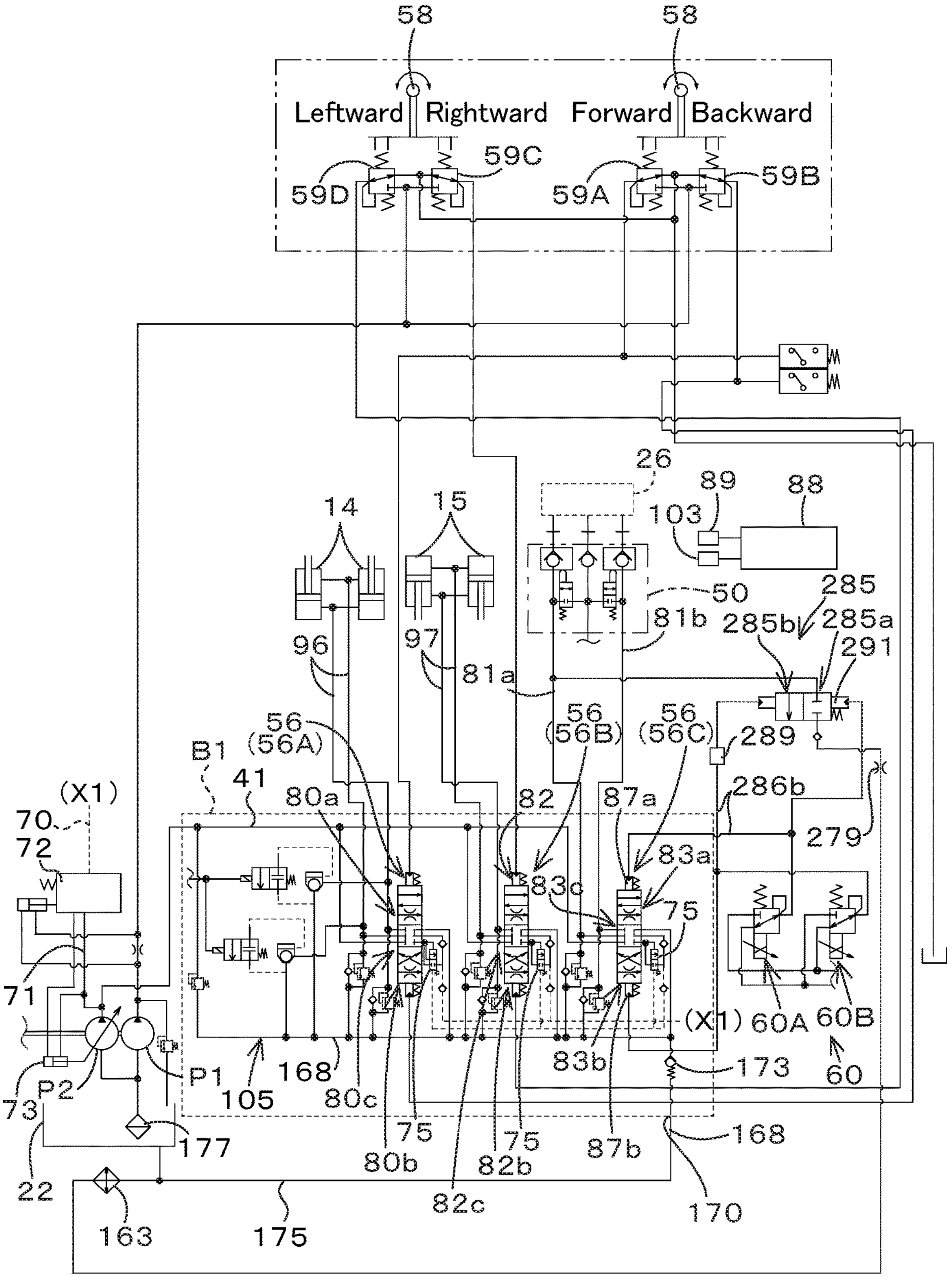
FIG. 12C is a view showing a modified example of the hydraulic system for the working machine according to the fifth embodiment.

As another modification, an actuation valve 289 may be provided on the pilot fluid passage 286*b* as shown in FIG. 12C. The actuation valve 289 is configured to shift the switching valve 285 and has a variable opening degree. The actuation valve 289 is a solenoid valve or a manual valve whose opening degree can be changed manually. When the actuation valve 289 is a manual valve, a pilot pressure acting on the pressure receiving portion 292 of the switching valve 285 can be set by manually opening or closing the actuation valve 289 fully.

In the examples shown in FIGS. 12A to 12C, the throttle portion 279 is provided on the second drain fluid passage 284*b*. Alternatively, as shown in FIG. 12E, a throttle portion 279 may be provided on the fluid passage in the switching valve 285 functionable when the switching valve 285 is shifted to the second position 285*b*.

Sixth Embodiment

Figure 12D:
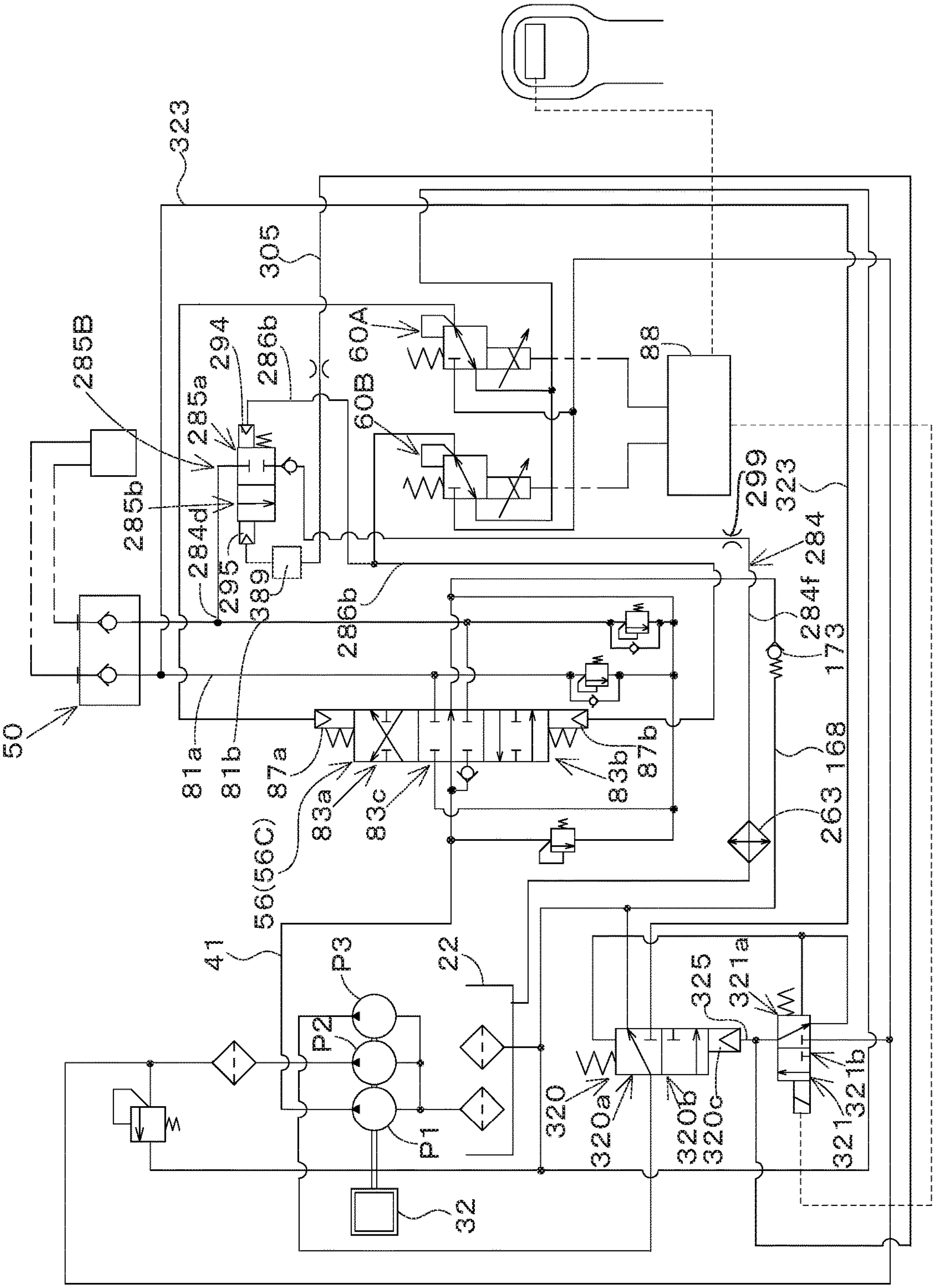
FIG. 12D is a schematic view of a hydraulic system for a working machine according to a sixth embodiment.
Figure 12E:
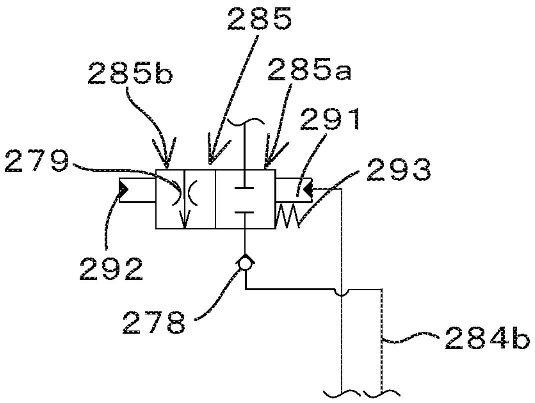
FIG. 12E is a view showing a modified example of a throttle in the hydraulic system for the working machine.

FIG. 12D shows a hydraulic system for a working machine according to a sixth embodiment. Explanations for configurations common to the above-mentioned embodiments will be omitted. The hydraulic system according to the fifth embodiment is not provided with the load sensing system.

The hydraulic system for the working machine shown in FIG. 12D includes a third hydraulic pump P3, an actuation valve 320, an actuation valve 321, a fluid passage 323, the second switching valve 285B, and the oil cooler 263.

The third hydraulic pump P3 is configured to be driven by a power of the prime mover 32 and is installed at a different location from the first hydraulic pump P1 and the second hydraulic pump (working hydraulic pump). The second hydraulic pump P2 and the third hydraulic pump P3 are configured to be driven by a power of the prime mover 32, and they are constant displacement gear pumps. That is, the first hydraulic pump P1, the second hydraulic pump P2, and the third hydraulic pump P3 are constant displacement gear pumps. In particular, the third hydraulic pump P3 serves as a flowrate-increasing hydraulic pump for increasing a flowrate of hydraulic fluid.

The fluid passage 323 branches from the first fluid passage 83 and is connected to the third hydraulic pump P3. In detail, the fluid passage 323 is connected at one end thereof to the first supply and discharge fluid passage 81*a*, and at the other end thereof to a delivery port of the third hydraulic pump P3.

The actuation valve (high-flow valve) 320 is provided on an intermediate portion of the fluid passage 323 and has a variable opening degree. The actuation valve 320 is a two-position switching valve to be operated by a pilot pressure, so that the actuation valve 320 can be shifted between two shift positions (first position 320*a* and second position 320*b*) by a pilot pressure. When the actuation valve 320 is in the first position 320*a*, an opening degree of the actuation valve 320 is substantially zero (i.e., fully closed), and a flowrate of hydraulic fluid flowing into the fluid passage 323 becomes zero (=0). In addition, when the actuation valve 320 is in the second position 320*b*, the actuation valve 320 is fully opened, and a flowrate of hydraulic fluid flowing into the fluid passage 323 becomes a predetermined amount greater than zero. In other words, the actuation valve 320 blocks the fluid passage 323 when the actuation valve 320 is in the first position 320*a*, and opens the fluid passage 323 when the actuation valve 320 is in the second position 320*b*.

Accordingly, by shifting the actuation valve 320 to the second position 320*b*, hydraulic fluid delivered from the third hydraulic pump P3 can be supplied to the fluid passage 323. The hydraulic fluid flowing into the fluid passage 323 is merged with the hydraulic fluid flowing in the first fluid passage 83. As a result, a flowrate of hydraulic fluid to be supplied to the auxiliary actuator 26 can be increased.

The actuation valve 320 is shifted by the actuation valve 321. The actuation valve 321 is a two-position switching solenoid valve. The actuation valve 321 can be shifted between a first position 321*a* and a second position 321*b*. The actuation valve 321 is connected to the actuation valve 320 by a fluid passage 325. In detail, the actuation valve 320 has a pressure receiving portion 320*c*. The pressure receiving portion 320*c* is capable of receiving pilot fluid. The pressure receiving portion 320*c* of the actuation valve 320 is connected to the actuation valve 321 by the fluid passage 325.

When the actuation valve 321 is in the first position 321*a*, a pilot pressure is not applied to the pressure-receiving portion 320*c* of the actuation valve 320, thereby shifting the actuation valve 320 to the first position 320*a*. When the actuation valve 321 is in the second position 321*b*, a pilot pressure is applied to the pressure receiving portion 320*c* of the actuation valve 320, thereby shifting the actuation valve 320 to the second position 320*b*.

The shifting between the first position 321*a* and the second position 321*b* in the actuation valve 321 is performed by the controller 88. A fluid passage 305 is connected to the fluid passage 325. An actuation valve 389 is connected to the fluid passage 305. The actuation valve 389 is a valve to shift the second switching valve 285B and configured to change an opening degree thereof. The actuation valve 389 is a solenoid valve or a manual valve whose opening degree can be changed manually. When the actuation valve 389 is a manual valve, the pilot pressure acting on the pressure receiving portion 295 of the second switching valve 285B can be set by manually opening or closing the actuation valve 389 fully.

The drain fluid passage 284 includes a sixth drain fluid passage 284*f* connecting the second switching valve 285B to the oil cooler 263. In the drain fluid passage 284, a throttle portion 299 is provided upstream of the oil cooler 263.

As described above, in the sixth embodiment, under a state where a flowrate of hydraulic fluid is increased, a pilot pressure acting on the pressure receiving portion 295 of the second switching valve 285B can be increased by increasing an opening degree of the actuation valve 389 to a threshold or more, thereby shifting the second switching valve 285B to the second position 285*b*. In this manner, hydraulic fluid of the second supply and discharge fluid passage 81*b* can be supplied to the oil cooler 263 via the sixth drain fluid passage 284*f* On the other hand, when an opening degree of the second proportional valve 60B is increased to a predetermined opening degree (threshold) or more, a pilot pressure to be applied to the pressure receiving portion 294 of the second switching valve 285B can be supplied, and the second switching valve 285B can be forced to return to the first position 285*a* (initial position).

Figure 12F:
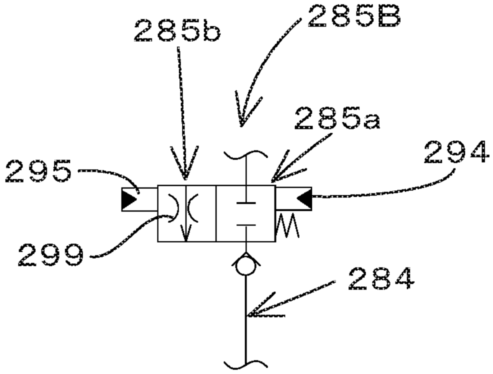
FIG. 12F is a view showing a modified example of the throttle in the hydraulic system for the working machine.

In the example shown in FIG. 12D, the throttle portion 299 is provided in the drain fluid passage 284. However, a throttle portion may be provided in a fluid passage communicating to the oil cooler 263 in the same manner as the aforementioned modifications of the embodiments. For example, as shown in FIG. 12F, the throttle portion 299 may be provided in the internal fluid passage of the second switching valve 285B that functions when the second switching valve 285B is set at the second position 285*b*.

Figure 12G:
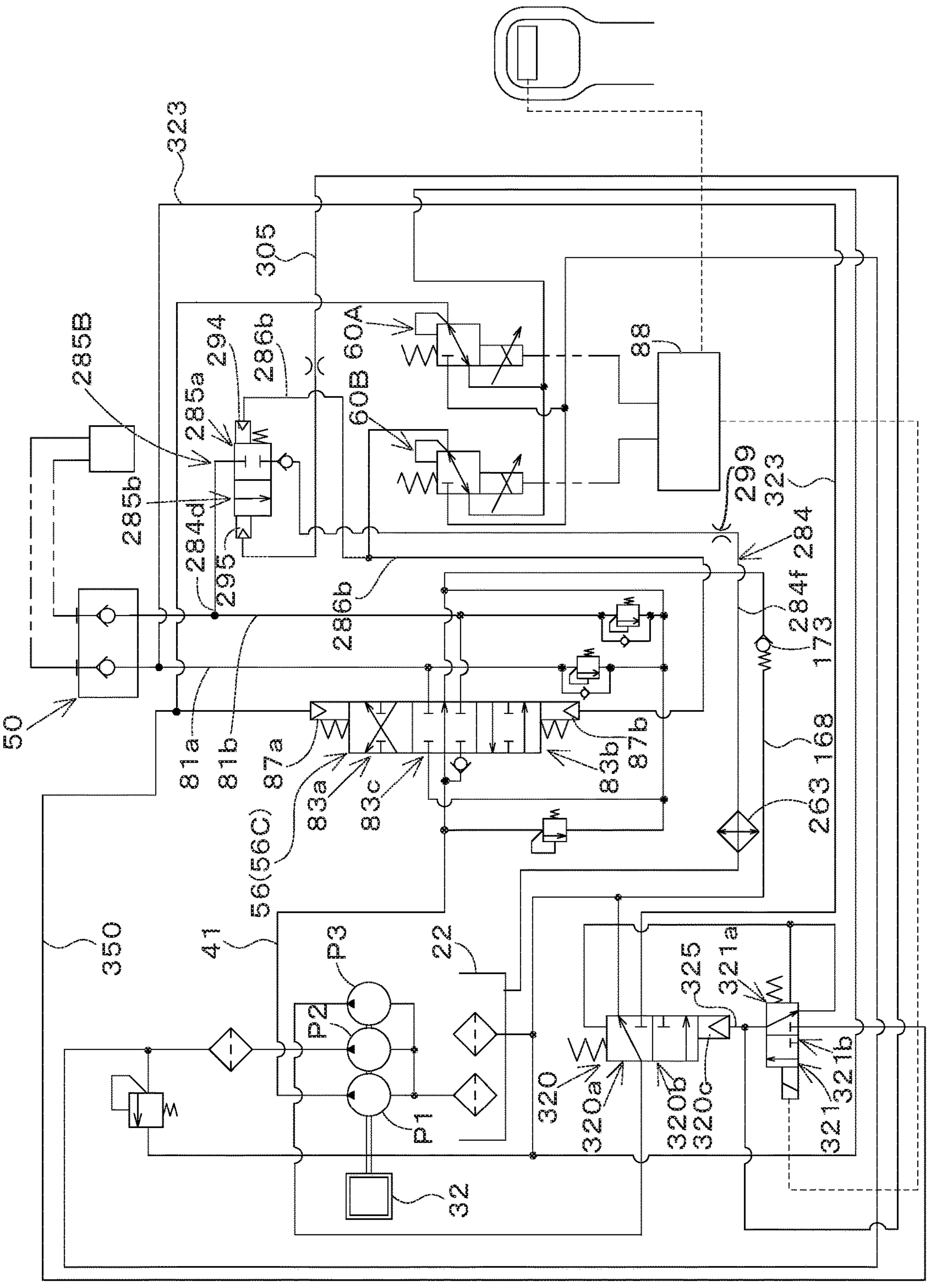
FIG. 12G is a view showing a modified example of FIG. 12D.

In addition, as shown in FIG. 12G, a fluid passage 350 may be provided to connect the input port of the actuation valve 321 to the pressure receiving portion 87*a* of the first auxiliary control valve 56C, so that the actuation valve 321 can be supplied with hydraulic fluid when hydraulic fluid acts on the pressure receiving portion 87*a*. In addition, the fluid passage 305 may be connected to the pressure receiving portion 295 of the second switching valve 285B as shown in FIG. 12G without the actuation valve 389 shown in FIG. 12D.

In the above embodiments, the first auxiliary control valve 56C and the second auxiliary control valve 56D are separately configured. Alternatively, the first auxiliary control valve 56C and the second auxiliary control valve 56D may be integrated as shown in FIG. 4E, for example. In the example shown in FIG. 4E, the first auxiliary control valve 56C is a four-position switching valve and can be shifted to the third position 83*d* in addition to the first position 83*a*, the second position 83*b*, and the neutral position 83*c*. In addition, the first auxiliary control valve 56C includes the output port 144, and the second discharge fluid passage 162 is connected to the output port 144.

When the first auxiliary control valve 56C is in the third position 83*d*, a fluid passage 181 connected to the second supply and discharge port 85 and a fluid passage 182 branched from the fluid passage 181 are provided inside the first auxiliary control valve 56C. The fluid passage 182 is a fluid passage that communicates to the output port 144 (the second discharge fluid passage 162) when the first auxiliary control valve 56C is in the third position 83*d*. The fluid passage 182 includes a throttle portion 279.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hydraulic system for a working machine, comprising:

a variable displacement hydraulic pump to deliver hydraulic fluid having a variable flowrate;

a plurality of hydraulic actuators actuated with hydraulic fluid; and a plurality of control valves each of which is shiftable among a plurality of shift positions so that the control valve, when shifted to one of the shift positions, controls a flowrate of hydraulic fluid flowing to the corresponding hydraulic actuator, wherein each of the control valves includes an input port into which hydraulic fluid delivered from the variable displacement hydraulic pump is input, an output port from which the hydraulic fluid input into the input port is output, and a flowrate reduction section configured so that, when the control valve is shifted to a reduction position serving as a specific one of the shift positions, the flowrate reduction section reduces a flowrate of the hydraulic fluid entering the input port and outputs the flowrate-reduced hydraulic fluid to the output port, at least one of the control valves includes a flowrate increase section configured so that, when the control valve is shifted to an increase position serving as another shift position different from the specific one of the shift positions, the flowrate increase section outputs the hydraulic fluid having entered the input port to the output port at a flowrate larger than that of hydraulic fluid output by the flowrate reduction section, the hydraulic actuators are a boom cylinder, a working tool cylinder, and an auxiliary actuator, the control valves are a boom control valve for controlling the boom cylinder, a working tool control valve for controlling the working tool cylinder, and a first auxiliary control valve for controlling the auxiliary actuator, the boom control valve and the working tool control valve each include the flowrate reduction section, and the first auxiliary control valve includes the flowrate reduction section and the flowrate increase section.

2. The hydraulic system according to claim 1, wherein the first auxiliary control valve having been shifted to the increase position returns from the increase position to the reduction position when either the boom control valve or the working tool control valve is shifted to the reduction position.

3. The hydraulic system according to claim 1, further comprising:

a proportional valve to allow a pilot pressure to act on a pressure receiving portion of the first auxiliary control valve, wherein the first auxiliary control valve is shifted to the reduction position and then to the increase position as the pilot pressure from the proportional valve acting on the pressure receiving portion increases.

4. The hydraulic system according to claim 2, further comprising:

a proportional valve to allow a pilot pressure to act on a pressure receiving portion of the first auxiliary control valve, wherein the first auxiliary control valve is shifted to the reduction position and then to the increase position as the pilot pressure from the proportional valve acting on the pressure receiving portion increases.

* * * * *